US011364619B1

(12) United States Patent
Bolton

(10) Patent No.: US 11,364,619 B1
(45) Date of Patent: Jun. 21, 2022

(54) CREEPER FOR GROUND WORK

(71) Applicant: Carl William Bolton, Santa Barbara, CA (US)

(72) Inventor: Carl William Bolton, Santa Barbara, CA (US)

( * ) Notice: Subject to any disclaimer, the term of this patent is extended or adjusted under 35 U.S.C. 154(b) by 0 days.

(21) Appl. No.: 17/484,740

(22) Filed: Sep. 24, 2021

Related U.S. Application Data

(63) Continuation-in-part of application No. 29/786,558, filed on Jun. 1, 2021.

(51) Int. Cl.
*A01D 67/04* (2006.01)
*B25H 5/00* (2006.01)

(52) U.S. Cl.
CPC .................................... *B25H 5/00* (2013.01)

(58) Field of Classification Search
CPC .......... B25H 5/00; B25H 1/00; B25H 1/0021; B25H 1/0035; B25H 1/0057; B25H 1/0078; B25H 1/04; B25H 1/10; B62B 3/00; B62B 3/02; B62B 3/04; B62B 2203/00; B62B 2203/60; B62B 2202/48
See application file for complete search history.

(56) References Cited

U.S. PATENT DOCUMENTS 1,660,521 A * 2/1928 Nordgren ................. B25H 3/06 211/70.6
2,849,900 A * 9/1958 Heidtman, Jr. ...... B25H 1/0078 408/112
3,890,058 A * 6/1975 Self ...................... B25H 1/0078 408/112
D237,872 S 12/1975 Miller
4,122,956 A * 10/1978 Hargrove ............. B25H 1/0007 108/28
4,391,558 A * 7/1983 Perry ....................... B23Q 1/48 144/106
4,484,844 A * 11/1984 Williams ............. B25H 1/0057 408/100
4,542,909 A * 9/1985 Littwin .................. F16M 11/42 280/47.35
D327,352 S 6/1992 Robinson
5,184,429 A * 2/1993 Parsons ................... B24B 19/02 451/353

(Continued)

OTHER PUBLICATIONS

Rockler, "Portable Drill Guide Instructions" http://go.rockler.com/tech/52885-Portable-Drill-Guide-Inst.pdf (last visited Sep. 21, 2021).

*Primary Examiner* — James M Dolak
(74) *Attorney, Agent, or Firm* — Eric Kelly

(57) ABSTRACT

A creeper for scooting around on top of decking for decking installation, maintenance, and/or repair activities may minimize injury to a human user's knees and/or back. Movement-means of the creeper, such as, but not limited to, casters may be attached at or near a bottom of a base of the creeper to facilitate such scooting around. A seat may be attached to a top of the base of the creeper, wherein the seat may be sat upon by the human user during use of the creeper. Also attached to the base of the creeper may be a drill-guide. The drill-guide may facilitate controlled and repeatable predrilling of pilot holes, at predetermined angles (e.g., perpendicular) into decking planks and/or into joists. The creeper may also facilitate attachment of decking members, with the pilot holes, to joists.

22 Claims, 16 Drawing Sheets

(56) References Cited

U.S. PATENT DOCUMENTS

| | | | | |
|---|---|---|---|---|
| 5,707,067 | A | 1/1998 | Smith | |
| D399,626 | S | 10/1998 | Taylor | |
| D410,128 | S | 5/1999 | Dallas | |
| D426,793 | S | 6/2000 | Lundh | |
| 6,302,413 | B1 | 10/2001 | Comeaux | |
| D453,601 | S | 2/2002 | Ji | |
| D463,143 | S | 9/2002 | Riddle | |
| 6,578,859 | B2 | 6/2003 | Chen | |
| 6,733,073 | B2 * | 5/2004 | Whiteside | A47C 7/62 211/119.07 |
| 6,860,682 | B1 * | 3/2005 | Le Picq | B25H 1/0078 408/112 |
| D522,261 | S | 6/2006 | Whiteside | |
| 7,070,241 | B2 | 7/2006 | Saulnier | |
| 7,086,702 | B1 | 8/2006 | Hurt | |
| D530,108 | S | 10/2006 | Whiteside | |
| D555,920 | S | 11/2007 | Whiteside | |
| D575,024 | S | 8/2008 | Mays | |
| D579,679 | S | 11/2008 | Qian | |
| 7,658,442 | B1 * | 2/2010 | Whiteside | B25H 3/028 297/188.11 |
| D618,467 | S | 6/2010 | Hung | |
| D625,526 | S | 10/2010 | Liuhong | |
| 7,878,513 | B2 | 2/2011 | Damouzehtash | |
| D672,986 | S | 12/2012 | Whiteside | |
| D701,717 | S | 4/2014 | Whiteside | |
| 8,844,947 | B1 | 9/2014 | Whiteside | |
| 8,973,596 | B2 * | 3/2015 | Hull | B05B 7/0408 137/1 |
| D729,561 | S | 5/2015 | Robins | |
| D750,391 | S | 3/2016 | Lensing | |
| 9,687,080 | B1 | 6/2017 | Thiel | |
| 9,701,010 | B2 | 7/2017 | Manjarres | |
| D803,593 | S | 11/2017 | Delk | |
| D808,673 | S | 1/2018 | Brewer | |
| D815,442 | S | 4/2018 | Harmon | |
| 10,022,858 | B2 | 7/2018 | Huang | |
| D843,675 | S | 3/2019 | Shrock | |
| D862,824 | S | 10/2019 | Hein | |
| D878,066 | S | 3/2020 | Lensing | |
| D884,372 | S | 5/2020 | Thiel | |
| D894,513 | S | 8/2020 | Sterns | |
| 11,247,325 | B2 * | 2/2022 | Jeremenko | B25H 1/0035 |
| 11,279,388 | B2 * | 3/2022 | Uriegas | B62B 3/04 |
| 2008/0258515 | A1 * | 10/2008 | Whiteside | A47C 9/00 297/174 R |
| 2018/0319007 | A1 * | 11/2018 | Wilkinson | B66F 11/04 |

* cited by examiner

CREEPER FOR GROUND WORK

PRIORITY NOTICE

The present patent application is a continuation-in-part (CIP) of U.S. non-provisional patent application Ser. No. 29/786,558 filed on Jun. 1, 2021, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to tools for facilitating decking installation, repair, and/or maintenance and more specifically to a creeper tool that is configured to facilitate decking installation, repair, and/or maintenance.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Traditionally, installing decking planks to joists to create a deck has involved the human carpenter standing while bent over and/or has involved the human carpenter kneeling on their knees, often with the knees at an angle of less than ninety (90) degrees, often much less. The traditional standing while bent over position often results in injury to the human carpenter's back. And the traditional kneeling position often results in injury to the human carpenter's knees. It would be desirable to have a tool (e.g., an appropriately designed creeper) that would permit the human carpenter to sit while installing deck planks to joists. It would also be desirable to have a tool (e.g., an appropriately designed creeper) that could readily move around on top of the given work surface (e.g., decking) while that human carpenter may be seated on the seat of the tool (creeper).

Further, traditionally, installing decking planks to joists to create a deck has involved the human carpenter using some form of handheld drill (e.g., cordless or corded) as a motive means to make pilot holes and/or as a means to drive fasteners (e.g., screws) into the deck planks and joists. It would be desirable to have a tool (e.g., an appropriately designed creeper) that had a seat for the human carpenter.

Avoiding and/or minimizing injuries may lead to less down time on a given job and/or to completing the given job in a faster and/or more efficient manner.

Further still, traditionally, installing decking planks to joists to create a deck has involved the human carpenter using some form of handheld drill without an assistive means to provide reliable, repeatable drilling/fastening angles from vertical. That is, each such pilot hole and/or secured fastener done by a handheld drill might be at a different angle because of the handheld nature of using such drills. It would be desirable to have a tool (e.g., an appropriately designed creeper) that not only had a seat for the human carpenter, but that also had a means (e.g., a drill-guide) to make controlled, reliable, and repeatable pilot holes. Via such a tool (creeper), the (screw) fasteners may be inserted into predrilled holes using a handheld drill/driver, mounted to the tool (creeper), with appropriate driver-bit that matches the configuration of the (screw) fastener's head, and while the human carpenter is seated on the tool (creeper).

There is a need in the art for a creeper with a seat, with movement-means, and with a drill-guide with lockable but variable/selectable angles of use via at least one protractor.

It is to these ends that the present invention has been developed.

BRIEF SUMMARY OF THE INVENTION

To minimize the limitations in the prior art, and to minimize other limitations that will be apparent upon reading and understanding the present specification, the present invention describes various embodiments of creepers for scooting around on top of decking, for decking installation, maintenance, and/or repair activities; wherein such use of a given creeper may minimize injury to a human user's knees and/or back. In some embodiments, movement-means of the creeper, such as, but not limited to, casters may be attached at or near a bottom of a base of the creeper to facilitate such scooting around. In some embodiments, a seat may be attached to a top of the base of the creeper, wherein the seat may be sat upon by the human user during use of the creeper. In some embodiments, attached to the base of the creeper may be a drill-guide. In some embodiments, the drill-guide may facilitate controlled and repeatable: drilling of pilot holes into decking planks and/or into joists (via a drill and drill-bits removably attached to the drill-guide) all while the human user is sitting in a comfortable position on the seat and facing the drill-guide.

In some embodiments, after the pilot holes may be formed, fasteners (e.g., decking screws) may be inserted into the predrilled pilot holes using a drill/driver (that may be handheld or may be removably attached to the drill-guide) to attach the decking planks to joists. When it may be desirable to use the drill/driver in a handheld manner (and not with the drill/driver removably attached to the drill-guide) for securing the fasteners (e.g., decking screws) in the pilot holes, the human carpenter may be seated in a comfortable position facing the rear of the creeper and away from the drill-guide, which may allow the human carpenter to be sufficiently close to the work surface.

Various embodiments, of the disclosed creeper are useful to human carpenters because from a seated position a given human carpenter is able to very efficiently pre-drill chamfered pilot holes with a creeper mounted drill-guide, removably fitted with a drill/driver, that are consistently at a desired predetermined angle (e.g., perpendicular) to the decking surface; and then to insert fastening screws into those pilot holes with a handheld drill/driver (not attached to the drill-guide) for attachment—all while providing protection and maintaining the health for knees and lower back of that given human carpenter. It is no longer necessary for the given human carpenter to spend an inordinate amount of time crawling on knees, kneeling, and/or standing bent over at the waist for decking work.

In some embodiments, use of the creepers disclosed herein may entail pre-placing one or more decking members (e.g., decking planks) on top of a joist substructure (or the like), that may be spaced apart appropriately, and then tacking down the decking members in several places to the top of the joist substructure, to keep the decking members held in position. Once decking member are tacked in place, chalk lines may be snaped over the center of the joists to determine permanent fastener positioning (or the like). Decking installation may progress in stages such that one may use the creeper initially to pre-drill pilot holes on a number of (tacked) decking members using the creeper mounted drill-guide with removably attached drill/driver—wherein this may be deemed Stage 1. Stage 2 may be for the human carpenter to sit on the seat of the creeper facing a rear of the creeper (and away from the drill-guide), to maneuver the creeper back over the predrilled pilot holes, and using a handheld drill/driver (not attached to the drill-guide), to insert and fasten fasteners (e.g., decking screws) into those pilot holes, securing the decking members to the joist substructure. Performing the pre-drilling pilot hole formation stage (Stage 1) and the fastener fastening stage (Stage 2) separately makes the whole decking installation process much more efficient.

So instead of the human carpenter spending 100% of time kneeling on knees and/or bending over at the waist to accomplish both the pre-drilling pilot hole formation and the fastener fastening of the decking members as traditionally and historically occurs without use of the creepers disclosed herein; that time kneeling and/or bent over at the waist may be cut down to only 5% to 10% by use of the creepers described herein. Scooting around on a creeper for 90% to 95% of the time doing a decking installation is much more beneficial to the health of the human carpenter and more efficient as well.

It is an objective of the present invention to provide a creeper that is configured to move around on top of a given work surface (i.e., a substantially planar and supportive surface).

It is another objective of the present invention to provide a creeper to avoid and/or minimize injuries to the human user's back and/or knees.

It is another objective of the present invention to provide a creeper to avoid and/or minimize injuries to the human user's back and/or knees by the creeper putting the human user into a more comfortable position (e.g., sitting).

It is another objective of the present invention to provide a creeper with a seat, wherein the seat is configured to be sat upon by a human user of the creeper.

It is another objective of the present invention to provide a creeper with a fixed position seat, wherein the seat is configured to be sat upon by a human user of the creeper.

It is another objective of the present invention to provide a creeper with an adjustable seat, wherein the seat is configured to be sat upon by a human user of the creeper.

It is another objective of the present invention to provide a creeper with a polygon shaped base.

It is another objective of the present invention to provide a creeper with a triangular shaped base.

It is another objective of the present invention to provide a creeper with movement-means to facilitate scooting around on top of the work surface (i.e., the substantially planar and supportive surface).

It is another objective of the present invention to provide a creeper with movement-means that may be selected from one or more of: a wheel, a caster, a roller, a shark wheel, a sled, a ski, portions thereof, combinations thereof, and/or the like.

It is another objective of the present invention to provide a creeper with a drill-guide.

It is another objective of the present invention to provide a creeper with a drill-guide for making controlled, reliable, and/or repeatable pilot holes into deck planks and/or joists at a particular lockable but selectable angle from vertical.

It is another objective of the present invention to provide a creeper with the human user seated facing the rear in order to insert screw fasteners into the predrilled pilot holes using a handheld drill/driver with the proper driver-bit for the screw head. The predrilled pilot hole having been drilled at a predetermined angle (e.g., perpendicular) to the surface will serve as a guide to ensure that the screw placement will also follow the predetermined angle (e.g., perpendicular) predrilled pathway into the decking member and underlying joist.

It is another objective of the present invention to provide a creeper with a drill-guide with carriage suspension spring(s).

It is another objective of the present invention to provide a creeper with at least one storage compartment (e.g., for accessory storage).

It is another objective of the present invention to provide a creeper with at least one saddlebag (e.g., for accessory storage).

It is another objective of the present invention to provide a creeper with the drill-guide located in front of the seat.

It is another objective of the present invention to provide a creeper with the drill-guide located in closer to a front of a base of the creeper than to a rear of the creeper.

It is yet another objective of the present invention to provide a creeper with the seat located in closer to a rear of a base of the creeper than to a front of the creeper.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 12 is more of a closeup view than FIG. 11.

REFERENCE NUMERAL SCHEDULE

Figure 1:
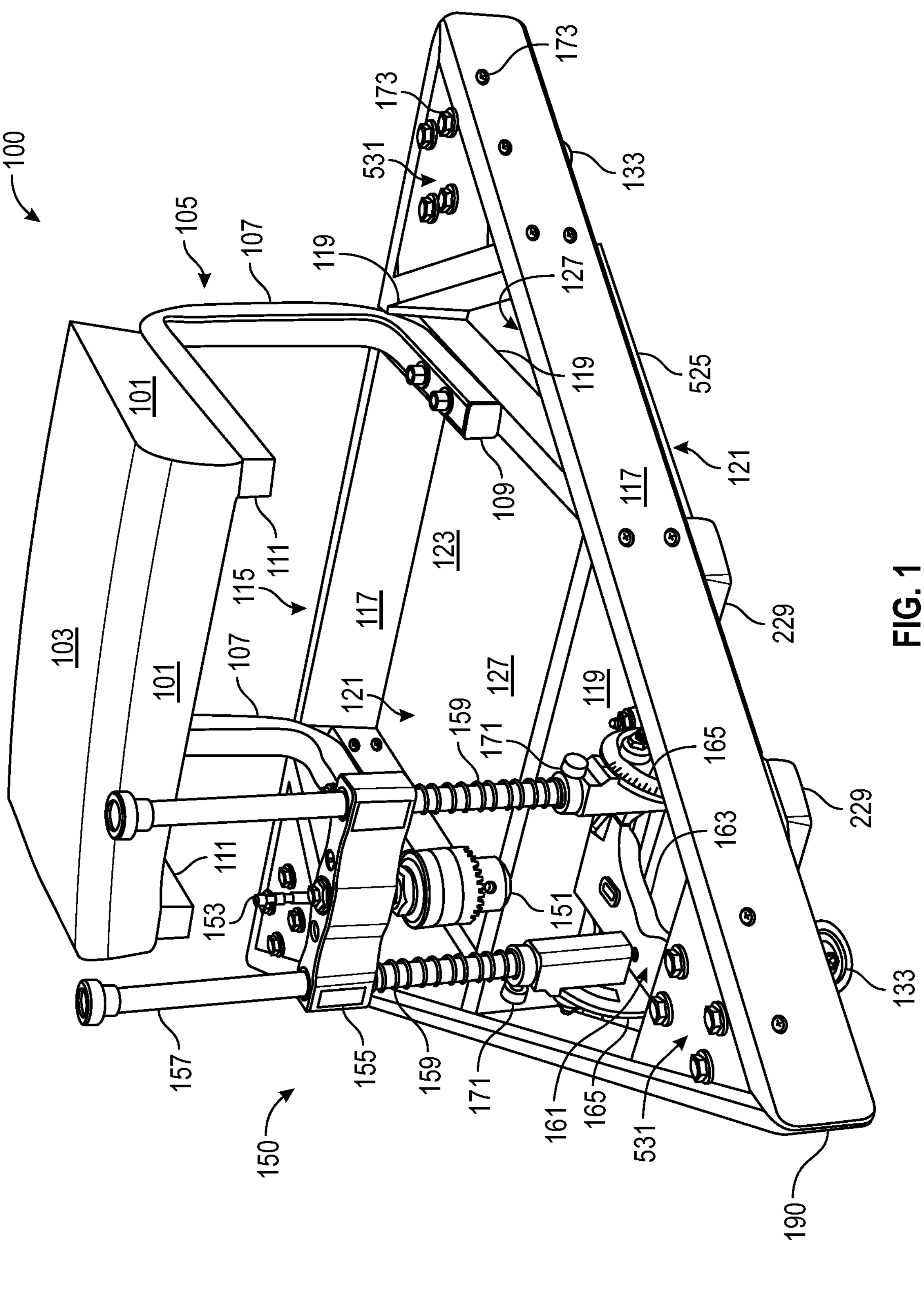
FIG. 1 depicts a top left perspective view of a creeper for ground work 100 (hereinafter "creeper 100").

100 creeper 100
101 seat 101
103 seat-top 103
105 seat-frame 105
107 vertical-member 107
109 base-member 109
111 horizontal-member 111
115 base 115
117 base-perimeter-frame 117
119 internal-frame 119
121 floor 121
123 floor-top 123
127 compartment 127
133 movement-means 133 (e.g., caster(s))
150 drill-guide 150
151 chuck 151
153 arbor/shank 153
155 carriage 155
157 guide-rail 157
159 spring 159
161 base 161
163 main-opening 163
165 protractor 165
167 set/lock-means 167 (e.g., nut for protractor 165)
169 adjuster 169 (for carriage 155)
171 adjuster 171 (for spring/guide-rail)
173 fastener 173
190 front 190
229 bottom-frame 229 (of base 115)
390 rear 390
490 seat-width 490
525 floor-bottom 525 (of floor 121)
531 attachment-region 531 (e.g., for movement-means 133 attachment to base 115)
690 seat-height 690
1101 leash 1101 (for chuck-key)
1301 drill 1301
1303 drill-bit(s) 1303
1305 plurality-of-fasteners (box of fasteners) 1305 (e.g., deck screws)
1307 saddle-bag 1307
1309 pocket 1309
1311 writing-implement 1311
1313 measurement-tool 1313 (e.g., tape measure)
1401 chuck-key 1401
1601 vertical-adjuster 1601
1603 forwards-backwards-adjuster 1603

DETAILED DESCRIPTION OF THE INVENTION

In some embodiments, a given creeper (e.g., creeper 100) may have a front portion (e.g., front 190), a rear (back) portion (e.g., rear 390), a top portion, a bottom portion, a left-side portion, a right-side portion, and/or the like. In some embodiments, the front portion (e.g., front 190) may be disposed opposite from the rear (back) portion (e.g., rear 390). In some embodiments, the top portion may be disposed opposite from the bottom portion. In some embodiments, the left-side region may be disposed opposite from the right-side portion. In some embodiments, a drill-guide (e.g., drill-guide 150) of the given creeper may be associated with and/or located closer to the front portion (e.g., front 190) than the rear (back) portion (e.g., rear 390) of the given creeper. In some embodiments, a seat (e.g., seat 101) of the given creeper may be associated with and/or located closer to the rear (back) portion (e.g., rear 390) than the front portion (e.g., front 190). In some embodiments, a drill-guide (e.g., drill-guide 150) of the given creeper may be associated with and/or located closer to the front portion (e.g., front 190) than the rear (back) portion (e.g., rear 390) of the given creeper. In some embodiments, the front portion (e.g., front 190) of the given creeper may be associated with one movement-means (e.g., movement-means 133 [e.g., one caster]). In some embodiments, the rear (back) portion (e.g., rear 390) of the given creeper may be associated with two separated and distinct movement-means (e.g., movement-means 133 [e.g., two separated and distinct casters]). In some embodiments, the given creeper may rest on top of a substantially/mostly planar and/or flat (work) surface. In some embodiments, this substantially/mostly planar and/or flat (work) surface may be a substantially/mostly horizontal surface. In some embodiments, this substantially/mostly planar and/or flat (work) surface may be a substantially/mostly horizontal surface, such as, but not limited to, a floor, the ground, decking, and/or the like. In some embodiments, a vertical direction may be substantially orthogonal to such the substantially/mostly planar and/or flat (work) surface that the given creeper may be resting on top of. Up and/or down directions, may refer to movement(s) parallel or substantially parallel with this vertical direction. For example, FIG. 1 shows a longitudinal length of two guide-rails 157 that are at least substantially parallel with the vertical direction. Front/back directions/movement refers to movement from the front portion (e.g., front 190) of the given creeper to the rear (back) portion (e.g., rear 390) of the given creeper or vice-versa.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 depicts a top left perspective view of a creeper for ground work 100 (hereinafter "creeper 100"). In some embodiments, creeper 100 may be a tool configured to facilitate decking installation, repair, and/or maintenance. In some embodiments, creeper 100 may be configured for scooting around on top of a substantially planar and supportive surface. In some embodiments, the substantially planar and supportive surface may be one or more of a top surface of a: floor, ground, deck, roof, a mostly/substantially flat surface, a mostly/substantially planar surface, portions thereof, combinations thereof, and/or the like. In some embodiments, creeper 100 may be a tool configured for moving around on top of and/or in direct physical contact with a top surface of a: floor, ground, deck, roof, a mostly/substantially flat surface, a mostly/substantially planar surface, portions thereof, combinations thereof, and/or the like. In some embodiments, creeper 100 may be a tool configured for being sat on top of by at least one human user. In some embodiments, creeper 100 may be a tool configured to be moved around the top surface of the: floor, ground, deck, roof, a mostly/substantially flat surface, a mostly/substantially planar surface, portions thereof, combinations thereof, and/or the like, by motive power provided (only) by the at least one human user (e.g., the feet and/or legs of that at least one human user). In some embodiments, creeper 100 may comprise at least one drill-guide 150, wherein drill-guide 150 may be configured for removable attachment to a drill 1301.

In some embodiments, drill 1301, drill-bit(s) 1303, fastener(s) 1305, portions thereof, combinations thereof, and/or the like, may be configured to install/remove decking onto joists (or other similar supportive structures for decking members). In some embodiments, drill-guide 150, drill 1301, drill-bit(s) 1303, fastener(s) 1305, portions thereof, combinations thereof, and/or the like, may be configured to install/remove decking onto joists (or other similar supportive structures for decking members). In some embodiments, drill-guide 150 may not be necessary for securing fastener(s) 1305 to decking and/or joists.

Continuing discussing FIG. 1, in some embodiments, movement of creeper 100 upon the substantially planar and supportive surface may be non-self-powered. In some embodiments, when movement of creeper 100 upon the substantially planar and supportive surface may be non-self-powered, such motive power may instead be provided by the human user; i.e., by the feet and/or legs of the human-user pushing along the top the substantially planar and supportive surface. Whereas, in other embodiments, movement of creeper 100 upon the substantially planar and supportive surface may be self-powered (i.e., powered by creeper 100 motor(s)).

Continuing discussing FIG. 1, in some embodiments, creeper 100 may comprise: seat 101, base 115, movement-means 133, and drill-guide 150. In some embodiments, base 115 may be a structural member and/or a supportive member, capable of structurally supporting seat 101, a body weight of the human user, drill-guide 150, various accessories, portions thereof, and/or the like. In some embodiments, seat 101 may be attached to base 115 by a seat-attachment-means. In some embodiments, seat 101 may be configured to be sat upon by the human user of creeper 100 during use of creeper 100. In some embodiments, movement-means 133 may be attached to base 115. In some embodiments, movement-means 133 may permit base 115 to scoot upon the top of the substantially planar and supportive surface. In some embodiments, drill-guide 150 may be attached to base 115. In some embodiments, drill-guide 150 may be configured to permit a drill 1301 and/or configured to permit at least one chuck-attachment 1303/1305 to be used, by the human user, at a locked and predetermined angle from a vertical direction, wherein the vertical direction is substantially orthogonal with a main plane of the top of the substantially planar and supportive surface.

Continuing discussing FIG. 1, in some embodiments, creeper 100 may comprise four main aspects (e.g., subassemblies and/or parts/components): a seat 101, a seat-attachment-means, a base 115, and drill-guide 150. In some embodiments, seat 101 may be configured to be sat upon by the human user. In some embodiments, the seat-attachment-means may be one or more structural members that links and attaches seat 101 to base 115. In some embodiments, base 115 may be a member that serves as a location for attachment of drill-guide 150, the seat-attachment-means, and movement-means 133 (e.g., casters).

Continuing discussing FIG. 1, in some embodiments, seat 101 may comprise one or more of: at least one cushion; at least one upholstered cushion; padding; foam; memory foam; backing; batting; fabric covering; at least partially waterproof; mostly/substantially waterproof; be waterproof; have a puncture resistant exterior; have a scratch resistant exterior; have a UV resistant exterior; have an easily cleanable/wipeable exterior surface; be substantially a horizontal member; be a substantially planar member; have an internal or bottom structural/supportive member; have buttocks support; have a back support; have a means (e.g., a zipper and/or Velcro) for accessing internal contents; have at least one pocket; have a trademark on an exterior portion; have a logo and/or graphic on an exterior portion; portions thereof; combinations thereof; and/or the like. In some embodiments, seat 101 may have a seat-top 103, which may be a top exterior surface of seat 101. Seat-top 103 of seat 101 may be seen in FIG. 1 and in FIG. 4. In some embodiments, seat 101 may be attached to an upper portion of the seat-attachment-means (e.g., horizontal-member 111) and a lower portion of the seat-attachment-means (e.g., base-member 109) may be attached to an upper portion of base 115. In some embodiments, seat 101 may be located closer to a rear of creeper 100 than to a front of creeper 100.

In some embodiments, seat 101 may be located above the seat-attachment-means and/or above base 115. In some embodiments, seat 101 may be located behind drill-guide 150. In some embodiments, seat 101 may be located vertically above a rear portion of base 115. During use of creeper 100, the human user may sit on seat 101 facing drill-guide 150 (facing forward/facing front 190), when use of drill-guide 150 is contemplated (e.g., for pilot hole formation in decking members); and when drill-guide 150 is not being used (e.g., during fastener 1305 installation into the formed pilot holes by use of a drill/driver 1301 that is not attached to drill-guide 150), the human user may sit on the seat 101 facing a rear 390 of creeper 100 (i.e., facing away from drill-guide 150). In some embodiments, seat 101 (or a portion thereof) may be configured to be swiveled and/or rotated with respect to the seat-attachment-means and/or with respect to base 115.

Continuing discussing FIG. 1, in some embodiments, base 115 may comprise one or more structural and/or supportive members that may carry an entire weight of creeper 100, along with accessories, and the human user—and while thusly loaded, be able to move relatively freely upon a mostly/substantially flat/planar service via movement-means 133 along with power from the human user. In some embodiments, base 115 may provide various locations for attachment of the seat-attachment-means, drill-guide 150, and/or movement-means 133. In some embodiments, the one or more structural and/or supportive members of base 115 may provide various locations for attachment of the seat-attachment-means, drill-guide 150, and/or movement-means 133.

Continuing discussing FIG. 1, in some embodiments, the one or more structural and/or supportive members of base 115 may comprise one or more of: base-perimeter-frame 117, internal-frame 119, floor 121, compartment 127, bottom-frame 229, attachment-region 531, movement-means 133, portions thereof, combinations thereof, and/or the like. In some embodiments, base 115 may comprise one or more of: base-perimeter-frame 117, internal-frame 119, floor 121, compartment 127, bottom-frame 229, attachment-region 531, movement-means 133, portions thereof, combinations thereof, and/or the like. In some embodiments, base 115 may comprise: at least one base-perimeter-frame 117, at least one internal-frame 119, at least one floor 121, at least one compartment 127, at least one bottom-frame 229, at least one attachment-region 531, at least one movement-means 133, portions thereof, combinations thereof, and/or the like. In some embodiments, base 115 may comprise: at least one base-perimeter-frame 117, at least one internal-frame 119, at least one floor 121, at least one compartment 127, at least one bottom-frame 229, an attachment-region 531 per each movement-means 133, at least three movement-means 133, portions thereof, combinations thereof, and/or the like.

Continuing discussing FIG. 1, in some embodiments, base 115 may comprise base-perimeter-frame 117. In some embodiments, base-perimeter-frame 117 may run around an outside perimeter of base 115. In some embodiments, base-perimeter-frame 117 may at least substantially/mostly enclose and/or surround a perimeter of floor 121. In some embodiments, base-perimeter-frame 117 may be comprised of one or more elongate structural members. In some embodiments, the one or more elongate structural members of base-perimeter-frame 117 may be hollow, solid, portions thereof, combinations thereof, and/or the like. In some embodiments, the one or more elongate structural members of base-perimeter-frame 117 may be at least substantially/mostly linear and/or straight. In some embodiments, base-perimeter-frame 117 may provide structural support, reinforcement, and/or rigidity to floor 121 and/or to creeper 100 in general. In some embodiments, base-perimeter-frame 117 may be located within one (1) inch of an outside edge/perimeter of floor 121 (plus or minus ¾ of one (1) inch). In some embodiments, base-perimeter-frame 117 may be attached to floor 121 (e.g., via use of one or more fasteners 173, glues, adhesives, epoxies, welds, solvent bonds, ultrasonic welds, portions thereof, combinations thereof, and/or the like). In some embodiments, when base-perimeter-frame 117 may be viewed from the top (or the bottom) a shape of base-perimeter-frame 117 may substantially/mostly resemble one or more of: a polygon, a triangle, a square, an oval, a circle, portions thereof, combinations thereof, and/or the like. In some embodiments, an exterior perimeter of base 115 may be shaped substantially as a polygon, when the creeper 100 is viewed from above or below, in a direction that is parallel with the vertical direction. In some embodiments, that polygon may be a triangle.

Continuing discussing FIG. 1, in some embodiments, base 115 may comprise one or more internal-frame 119 members. In some embodiments, internal-frame 119 members may be located within a boundary/perimeter defined by base-perimeter-frame 117. In some embodiments, a given internal-frame 119 member may run from one inside side of base-perimeter-frame 117 to another/different inside side of base-perimeter-frame 117 and/or to a different internal-frame 119 member. In some embodiments, terminal ends of internal-frame 119 member may be attached to an inside side of base-perimeter-frame 117 and/or to a different internal-frame 119 member via use of one or more fasteners 173, glues, adhesives, epoxies, welds, solvent bonds, ultrasonic welds, portions thereof, combinations thereof, and/or the like. In some embodiments, internal-frame 119 member may be attached to floor 121, base-perimeter-frame 117, other/different internal-frame 119 member(s) via use of one or more fasteners 173, glues, adhesives, epoxies, welds, solvent bonds, ultrasonic welds, portions thereof, combinations thereof, and/or the like. In some embodiments, internal-frame 119 member may be an elongate structural member. In some embodiments, the elongate structural member of internal-frame 119 member may be hollow, solid, portions thereof, combinations thereof, and/or the like. In some embodiments, the elongate structural member of internal-frame 119 member may be at least substantially/mostly linear and/or straight. In some embodiments, internal-frame 119 may provide structural support, reinforcement, and/or rigidity to floor 121, to base-perimeter-frame 117, and/or to creeper 100 in general.

Continuing discussing FIG. 1, in some embodiments, base 115 may comprise at least one floor 121. In some embodiments, floor 121 may be a floor of base 115. In some embodiments, floor 121 may have a floor-top 123 and a floor-bottom 525 (see e.g., FIG. 5 for floor-bottom 525). In some embodiments, floor-top 123 and floor-bottom may be opposing main/major surfaces of floor 121. In some embodiments, floor 121, floor-top 123, and/or floor-bottom 525 may be substantially/mostly at least one or more of: flat; planar; smooth; rigid; free of holes, gaps, or openings that would permits screws or the like to fall through; have a predetermined thickness; be solid; be hollow; portions thereof; combinations thereof; and/or the like. In some embodiments, floor 121 may have thickness of one half (½) of an inch to one sixteenth (1/16) of an inch. In some embodiments, a shape of floor base-perimeter-frame 117, as viewed from the top (or the bottom) may be substantially similar to such a shape of base-perimeter-frame 117. In some embodiments, floor 121 may be located below one or more of: seat 101, internal-frame 119 member(s), base-perimeter-frame 117, portions thereof, combinations thereof, and/or the like. In some embodiments, floor 121 may be located above at least portions of bottom-frame 229 member(s) (see e.g., FIG. 1, FIG. 2, FIG. 6, and FIG. 7). In some embodiments, floor 121 member may be base-perimeter-frame 117 and/or internal-frame 119 member(s) via use of one or more fasteners 173, glues, adhesives, epoxies, welds, solvent bonds, ultrasonic welds, portions thereof, combinations thereof, and/or the like.

Continuing discussing FIG. 1, in some embodiments, base 115 may comprise at least one compartment 127. In some embodiments, compartment 127 may be configured to removably house/hold one or more accessories (wherein the accessories may compliment use of creeper 100). In some embodiments, base 115 may comprise at least one compartment 127 accessible from a top of base 115. In some embodiments, compartment 127 may be formed from portions of base-perimeter-frame 117, internal-frame 119 member, and/or floor 121 floor-top 123. In some embodiments, a portion of floor 121 floor-top 123 may form a floor (bottom planar surface) for compartment 127. In some embodiments, sides (e.g., side walls) of compartment 127 may be formed from portions of base-perimeter-frame 117 and/or of internal-frame 119 member. In some embodiments, compartment 127 may be open and/or uncovered at a top of compartment 127. In some embodiments, compartment 127 may be accessed from the open and/or the uncovered top of compartment 127. In some embodiments, the top of compartment 127 may be (removably) covered with a lid and/or a cover. In some embodiments, there may be a predetermined quantity of compartments 127 per a given base 115. In some embodiments, there may be one, two, and/or three compartments 127 per a given base 115. In some embodiments, there may be a larger central compartment 127 (also referred to as, central-main-compartment 127) that may be flanked on both sides by flanking smaller compartments 127 (also referred to as, two-side-flanking compartments 127). In some embodiments, the larger central compartment 127 may be located vertically directly below seat 101. In some embodiments, the flanking smaller compartments 127 may be located below and to the right and to the left of seat 101. In some embodiments, located below and to the right of seat 101 may be one flanking smaller compartment 127; and located below and to the left of seat 101 may be the other remaining flanking smaller compartment 127. In some embodiments, the larger central compartment 127, as viewed from the top, may have a shape that substantially/mostly resembles a polygon, such as, but not limited to, a square, a rectangle, and/or a parallelogram (see e.g., FIG. 1 and FIG. 4). In some embodiments, the flanking smaller compartment 127, as viewed from the top, may have a shape that substantially/mostly resembles a polygon, such as, but not limited to, a triangle (see e.g., FIG. 1 and FIG. 4).

Continuing discussing FIG. 1, in some embodiments, the at least one compartment 127 may be three (separate and distinct) compartments, a central-main-compartment 127 and two-side-flanking compartments 127, respectively. In some embodiments, one of the two-side-flanking compartments 127 may be located to a left of the central-main-compartment 127. In some embodiments, a remaining of the two-side-flanking compartments 127 may be located to a right of the central-main-compartment 127, such that the central-main-compartment 127 may be disposed between the two-side-flanking compartments 127 in a direction from left to right or right to left of creeper 100. In some embodiments, the two-side-flanking compartments 127 may be (substantially/mostly) triangular in shape when viewed from above creeper 100. In some embodiments, central-main-compartment 127 may be (substantially/mostly) parallelogram in shape when viewed from above creeper 100. In some embodiments, central-main-compartment 127 may be located at least mostly vertically below seat 101. In some embodiments, the two-side-flanking compartments 127 may not be located vertically directly below seat 101 such that seat 101 does not extend over either of the two-side-flanking compartments 127. See e.g., FIG. 1 and FIG. 4.

Continuing discussing FIG. 1, in some embodiments, base 115 may comprise two, three, or more movement-means 133. In some embodiments, movement-means 133 may permit, facilitate, and/or promote sliding, rolling, and/or general movement/translation of a bottom of base 115 along and upon a given generally flat/planar surface that is supporting creeper 100 (such as, but not limited to, decking). In some embodiments, movement-means 133 may be selected from one or more of: a wheel, a caster, a roller, a shark wheel, a sled, a ski, portions thereof, combinations thereof, and/or the like. In some embodiments, movement-means 133 may comprise one or more ball bearings and/or lubricants. In some embodiments, movement-means 133 may have a fixed/finite diameter selected from a range of two (2) inches to three and one half (3.5) inches. In some embodiments, movement-means 133 may have a fixed/finite width one (1) half inch to one and one half (1.5) inches. In some embodiments, an exterior surface and/or shape of movement-means 133 may be configured to reduce, mitigate, and/or prevent marring of decking surfaces—wherein this may be accomplished by having a predetermined durometer, having a predetermined width/thickness, and/or by having a predetermined radius. In some embodiments, movement-means 133 may be configured for 360-degree rotation about a given vertical axis (e.g., a rotatable caster). In some embodiments, movement-means 133 may be have various operational states such as, but not limited to, a freely moving state; a locked state, wherein movement is generally prevented; an extended state for the freely moving state; and/or a retracted state. In some embodiments, a bottom most portion of movement-means 133 may extend beyond a bottom most portion of floor floor-bottom 525 and/or of bottom-frame movement-means 133 member. In some embodiments, for each corner region of base 115 (e.g., when base 115 may be viewed from the bottom) there may be at least one movement-means 133 (see e.g., FIG. 5). In some embodiments, a quantity of the movement-means 133 may match a quantity of main corners of base 115, such that each (bottom) main corner of base 115 has at least one movement-means 133 attached thereto. For example, and without limiting the scope of the present invention, when base 115 may have a generally triangular shape, when viewed from below/bottom, there may be three different regions (corner regions) and thus three different movement-means 133 (see e.g., FIG. 5).

Continuing discussing FIG. 1, in some embodiments, creeper 100 may comprise the seat-attachment-means. In some embodiments, the seat-attachment-means may be the structural linkage between seat 101 and base 115. In some embodiments, the seat-attachment-means may be attached to both seat 101 and to base 115 (via use of one or more fasteners 173, glues, adhesives, epoxies, welds, solvent bonds, ultrasonic welds, portions thereof, combinations thereof, and/or the like). In some embodiments, the seat-attachment-means may be fixed and non-movable. In some embodiments, the seat-attachment-means may be at least one elongate structural member that is substantially shaped as an upper-case letter “U” when creeper 100 is viewed from a right-side or from a left-side. In some embodiments, a top opening of that upper-case letter “U” shape is facing a front of creeper 100 and a closed bottom-end of that upper-case letter “U” shape is facing a rear of creeper 100 (see e.g., FIG. 6 or FIG. 7). In some embodiments, the seat-attachment-means may be at least two elongate structural members that are spaced apart from each other by a width dimension of the seat (e.g., seat-width 490), wherein the width dimension (e.g., seat-width 490) is from a right-side of the seat to a left-side of seat 101. In some embodiments, the seat-attachment-means may not be adjustable so that the seat 101 may be in a constant and a fixed distance from base 115.

Continuing discussing FIG. 1, in some embodiments, the seat-attachment-means may comprise seat-frame 105. In some embodiments, seat-frame 105 may be one or more “C” or “U” shaped structural members. In some embodiments, seat-frame 105 may be two separate and distinct “C” or “U” shaped structural members that spaced apart from each other by seat-width 490 of seat 101. In some embodiments, an opening to the “C” or to the “U” of seat-frame 105 may be facing the front of creeper 100. In some embodiments, an opening to the “C” or to the “U” of seat-frame 105 may be facing drill-guide 150. In some embodiments, an opening to the “C” or to the “U” of seat-frame 105 may be closer to drill-guide 150 than to the rear of base-perimeter-frame 117. In some embodiments, a stem portion (rear) of the “C” or to the "U" of seat-frame 105 may be facing the rear front of creeper 100. In some embodiments, a stem portion (rear) of the "C" or to the "U" of seat-frame 105 may be closer to the rear of base-perimeter-frame 117 than to drill-guide 150. In some embodiments, seat-frame 105 may be one or more of: elongate, rigid, structural, hollow, solid, smooth, portions thereof, combinations thereof, and/or the like.

Continuing discussing FIG. 1, in some embodiments, seat-frame 105 may comprise a vertical-member 107, a base-member 109, and a horizontal-member 111. In some embodiments, vertical-member 107, base-member 109, and/or horizontal-member 111 may be one or more of: elongate, rigid, structural, hollow, solid, linearly straight, smooth, portions thereof, combinations thereof, and/or the like. In some embodiments, base-member 109 and horizontal-member 111 may be both substantially parallel with each other and both may be substantially horizontal. In some embodiments, vertical-member 107 may be substantially vertical. In some embodiments, vertical-member 107 may be substantially perpendicular and/or orthogonal to both base-member 109 and horizontal-member 111. In some embodiments, at a bottom end of vertical-member 107, vertical-member 107 may be attached to base-member 109; and at a top end of vertical-member 107, vertical-member 107 may be attached to horizontal-member 111. In some embodiments, vertical-member 107 may be disposed between base-member 109 and horizontal-member 111. In some embodiments, vertical-member 107, base-member 109, and horizontal-member 111 may be integral with each other, i.e., as one single component/part, but three distinct different regions.

Continuing discussing FIG. 1, in some embodiments, base-member 109 may be attached to base 115 (via use of one or more fasteners 173, glues, adhesives, epoxies, welds, solvent bonds, ultrasonic welds, portions thereof, combinations thereof, and/or the like). In some embodiments, base-member 109 may be attached to internal-frame 119 member, floor 121, and/or to base-perimeter-frame 117 (via use of one or more fasteners 173, glues, adhesives, epoxies, welds, solvent bonds, ultrasonic welds, portions thereof, combinations thereof, and/or the like). In some embodiments, horizontal-member 111 may be attached to seat 101 (via use of one or more fasteners 173, glues, adhesives, epoxies, welds, solvent bonds, ultrasonic welds, portions thereof, combinations thereof, and/or the like). In some embodiments, horizontal-member 111 may be located beneath/under seat 101. In some embodiments, horizontal-member 111 may be attached to an underside of seat 101 (via use of one or more fasteners 173, glues, adhesives, epoxies, welds, solvent bonds, ultrasonic welds, portions thereof, combinations thereof, and/or the like).

In some embodiments, base-perimeter-frame 117, internal-frame 119 members, floor 121, bottom-frame 229 member(s), seat 101 (the buttocks support region), seat-top 103, base-member 109, and horizontal-ember 111 may all run in parallel horizontal directions/planes with each other.

Continuing discussing FIG. 1, in some embodiments, creeper 100 and/or base 115 may comprise at least one drill-guide 150. In some embodiments, drill-guide 150 may be configured to facilitate controlled, repeatable, and/or consistent drilling for purposes of creating screw (fastener) receiving holes (e.g., pilot holes) in decking and/or in joists. In some embodiments, drill-guide 150 may be configured to facilitate controlled, repeatable, and/or consistent drilling for purposes of creating screw (fastener) receiving holes (e.g., pilot holes) in decking and/or in joists; and/or for attaching screws (fasteners) to such receiving holes in the decking and/or in the joists. In some embodiments, drill-guide 150 may be configured to move reciprocally (e.g., backwards and forwards and/or up and down [e.g., vertically up and down when the protractor(s) 165 angle from vertical is set to zero (0) degrees]) in a repeatable and consistent manner via use of guide-rail(s) 157 (and/or spring(s) 159). In some embodiments, drill-guide 150 may be configured to operate at fixed, but variable angles of operation (from vertical), in a repeatable and consistent manner via use of adjustable and lockable protractor(s) 165. In some embodiments, an upper end/portion (e.g., arbor/shank 153) may be configured for removable attachment to a drill; and an opposing lower end/portion (e.g., chuck 151) may be configured for removable attachment to various drill bits 1303 and/or various driver bits. In some embodiments, drill-guide 150 may be a drill press or the like. In some embodiments, drill-guide 150 may be a "Rockier drill guide" or the like. Rockier drill guide instructions and product documentation are incorporated by reference in their entireties as if fully set forth herein. See also FIG. 10 for drill-guide 150.

Continuing discussing FIG. 1, in some embodiments, drill-guide 150 may comprise a chuck 151 and an arbor/shank 153 subassembly. In some embodiments, chuck 151 may be a chuck. In some embodiments, chuck 151 may be a half (½) inch chuck or some other predetermined size of chuck. In some embodiments, a given size of chuck 151 may be changed/swapped for another size of chuck 151. In some embodiments, chuck 151 may be configured for removable gripping/attachment of various drill-bits 1303 and/or various driver-bits. In some embodiments, arbor/shank 153 may be configured for removable attachment to a chuck of a drill 1301. In some embodiments, arbor/shank 153 may be a predetermined style, shape, and/or size of shank. In some embodiments, arbor/shank 153 may be a hex shank or the like. In some embodiments, arbor/shank 153 may be a quarter (¼) inch hex shank. In some embodiments, a given size/shape of arbor/shank 153 may be changed/swapped for another size/shape of arbor/shank 153. See also FIG. 10 for drill-guide 150.

Continuing discussing FIG. 1, in some embodiments, this chuck 151 and an arbor/shank 153 subassembly may be attached to a carriage 155. In some embodiments, carriage 155 may hold (attach to) the chuck 151 and an arbor/shank 153 subassembly. In some embodiments, carriage 155 may ride (linearly) along guide-rail(s) 157. In some embodiments, carriage 155 may comprise a through-hole configured for receiving a length portion of guide-rail 157. In some embodiments, the chuck 151 and an arbor/shank 153 subassembly may be held in a middle/central region of carriage 155, with the through-holes located to either side of the chuck 151 and an arbor/shank 153 subassembly. In some embodiments, carriage 155 may have a quantity of through-holes that matches a quantity of guide-rail(s) 157. In some embodiments, drill-guide may comprise one or two or more guide-rails 157. In some embodiments, guide-rail 157 may be linearly straight member. In some embodiments, when there may be two or more guide-rail(s) 157, lengths of those guide-rail(s) 157 may be substantially parallel with each other. In some embodiments, portions of guide-rail(s) 157 may be fitted with a spring 159. In some embodiments, spring 159 may be a compression helix/helical/coiled spring. In some embodiments, each guide-rail 157 may comprise at least one such spring 159. In some embodiments, a portion of a length of guide-rail 157 may be located in the hollow center of spring 159. In some embodiments, lengths of spring(s) 159 may be substantially parallel with lengths of guide-rail(s) 157. In some embodiments, for a pair of spring 159 and guide-rail 157, that pair may be concentric with respect to each other, with the guide-rail 157 being in the center and the spring 159 surrounding that guide-rail 157. In some embodiments, with respect to a vertical direction, a given spring 159 may be trapped and disposed between a bottom of carriage 155 and above an outside edge of protractor 165. In some embodiments, spring(s) 159 may facilitate ease of movement of carriage 155 (and whatever carriage 155 may be carrying, such as, but not limited to, the chuck 151 and an arbor/shank 153 subassembly, drill 1301, drill bit 1303, fastener 1305, and/or the like) along guide-rail(s) 157. See also FIG. 10 for drill-guide 150.

Continuing discussing FIG. 1, in some embodiments, bottom portions/ends of guiderail(s) 157 may be affixed to base 161 of drill-guide 150. In some embodiments, bottom portions/ends of guide-rail(s) 157 may be affixed to protractor(s) 165. In some embodiments, protractor(s) 165 may be affixed (attached) to base 161 of drill-guide 150. In some embodiments, base 161 may be a base of drill-guide 150. In some embodiments, base 161 of drill-guide 150 may comprise main-opening 163. In some embodiments, main-opening 163 may be largest/main opening/hole in base 161. In some embodiments, main-opening 163 may be configured to permit passage of chuck 151, drill bits 1305, drivers, fasteners 1305, and/or to provide a clear visual line of sight from the given work surface (e.g., decking surface) that is below creeper 100 to the human user (operator) of drill-guide 150. In some embodiments, base 161 of drill-guide 150 may be attached to base 115, floor 121, base-perimeter-frame 117, internal-frame 119 member, bottom-frame 229 member, portions thereof, combinations thereof, and/or the like (via use of one or more fasteners 173, glues, adhesives, epoxies, welds, solvent bonds, ultrasonic welds, portions thereof, combinations thereof, and/or the like). In some embodiments, base 161 may have one or more mounting holes for securing base 161 to base 115, floor 121, base-perimeter-frame 117, internal-frame 119 member, bottom-frame 229 member, portions thereof, combinations thereof, and/or the like. See also FIG. 10 for drill-guide 150.

Continuing discussing FIG. 1, in some embodiments, base 161 may comprise one or more protractors 165. In some embodiments, base 161 may comprise a quantity of protractors 165 that matches a quantity of guide-rails 157. In some embodiments, base 161 may comprise two (2) protractors 165. In some embodiments, attached to an upper surface of base 161 may be protractor 165. In some embodiments, on either side (e.g., with respect to a width direction) of main-opening 163 may be a protractor 165. In some embodiments, protractor 165 may be configured to permit variation of an angle from vertical of guide-rail(s) 157. For example, a protractor 165 angle setting of zero (0) degrees may correspond to guide-rail(s) 157 being vertical (perpendicular to decking surface). In some embodiments, this angle may be varied from zero (0) degrees to seventy-five (75) degrees. In some embodiments, this angle may be varied from zero (0) degrees to sixty (60) degrees. In some embodiments, an exterior surface of protractor 165 may be marked with visual indicators of the various/different angles that may be selected. In some embodiments, once a given angle may be selected, that angle may be locked in by set/lock-means 167. In some embodiments, set/lock-means 167 may be a screw and/or nut assembly, wherein tightening of that nut may lock in a given selected angle of protractor 167. By drilling and fastening decking to joists at an angle other than zero (0) degrees from vertical, at least some fasteners 1305 may be hidden from view when viewing the decking from above. See also FIG. 10 for drill-guide 150.

In some embodiments, drill-guide 150 may comprise one or more of: chuck 151, arbor/shank 153, carriage 155, guide-rail 157, spring 159, protractor, base 161, portions thereof, combinations thereof, and/or the like. See also FIG. 10 for drill-guide 150.

Continuing discussing FIG. 1, in some embodiments, drill-guide may comprise at least one adjuster 169. In some embodiments, adjuster 169 may be configured to adjust how easy carriage slides along a length of guide-rail(s) 157. In some embodiments, adjuster 169 may be located and/or attached to carriage 155. In some embodiments, adjuster 169 may be located and/or attached to a side/end of carriage 155, proximate to where a given guide-rail 157 may be located within a receiving hole of carriage 155. In some embodiments, tightening (by turning in one direction) adjuster 169 against carriage 155 and/or against guide-rail 157 may impart friction as between carriage 155 and that guide-rail 157. In some embodiments, loosening (by turning in an opposite direction) adjuster 169 against carriage 155 and/or against guide-rail 157 may reduce friction as between carriage 155 and that guide-rail 157. In some embodiments, adjuster 169 may be a set screw and/or a set bolt. In some embodiments, a head (knob) of adjuster 169 may be configured to be gripped and/or turn by a human hand and/or by human fingers/thumb. See also FIG. 10 for drill-guide 150.

Continuing discussing FIG. 1, in some embodiments, drill-guide may comprise at least one adjuster 171. In some embodiments, drill-guide may comprise at least two adjusters 171. In some embodiments, drill-guide may comprise a quantity of adjusters 171 that matches a quantity of guide-rails 157. In some embodiments, each guide-rail 157 may comprise at least one adjuster 171. In some embodiments, adjuster 171 may be configured to adjust where carriage 155 stops when moving down on guide-rail(s) 157. In some embodiments, adjuster 171 may be located on a given guide-rail 157, adjustably disposed between the bottom of carriage 155 and a top of protractor 165. In some embodiments, tightening (by turning in one direction) adjuster 171 against guide-rail 157 may impart friction as between adjuster 171 and that guide-rail 157. In some embodiments, loosening (by turning in an opposite direction) adjuster 171 against that guide-rail 157 may reduce friction as between adjuster 171 and that guide-rail 157. In some embodiments, adjuster 171 may comprise a set screw and/or a set bolt. In some embodiments, a head (knob) of adjuster 171 may be configured to be gripped and/or turn by a human hand and/or by human fingers/thumb. See also FIG. 10 for drill-guide 150.

Continuing discussing FIG. 1, in some embodiments, drill-guide 150 may be mounted to base 115 in front of seat 101. In some embodiments, drill-guide 150 is located closer to a front (corner/point) of base 115 than to a rear of base 115. In some embodiments, drill-guide 150 may comprise at least one suspension spring 159 disposed around at least one guide-rail 157 of drill-guide 150.

Continuing discussing FIG. 1, in some embodiments, creeper 100 may comprise at least one fastener 173. In some embodiments, creeper 100 may comprise a plurality of fasteners 173. In some embodiments, fastener(s) 173 may be used to attach various components, part, structures, surfaces, elongate members, structural members, planar members, portions thereof, combinations thereof, and/or the like of creeper 100 to each other.

In some embodiments, fastener(s) 173 may be used to attach seat 101, seat bottom, seat-frame 105, vertical-member 107, base-member 109, horizontal-member 111, base 115, base-perimeter-frame 117, internal-frame 119 member, floor 121, floor-top 123, floor-bottom 525, compartment 127, bottom-frame member 229, attachment-region 531, movement-means 133, drill-guide 150, base 161, portions thereof, combinations thereof, and/or the like of creeper 100 to each other. In some embodiments, fastener 173 may be selected from one or more of: a screw, a bolt, a nail, a pin, a rod, a rivet, a staple, a tack, a section of tape, a portion of glue, a portion of adhesive, a portion of epoxy, a weld, portions thereof, combinations thereof, and/or the like.

Figure 2:
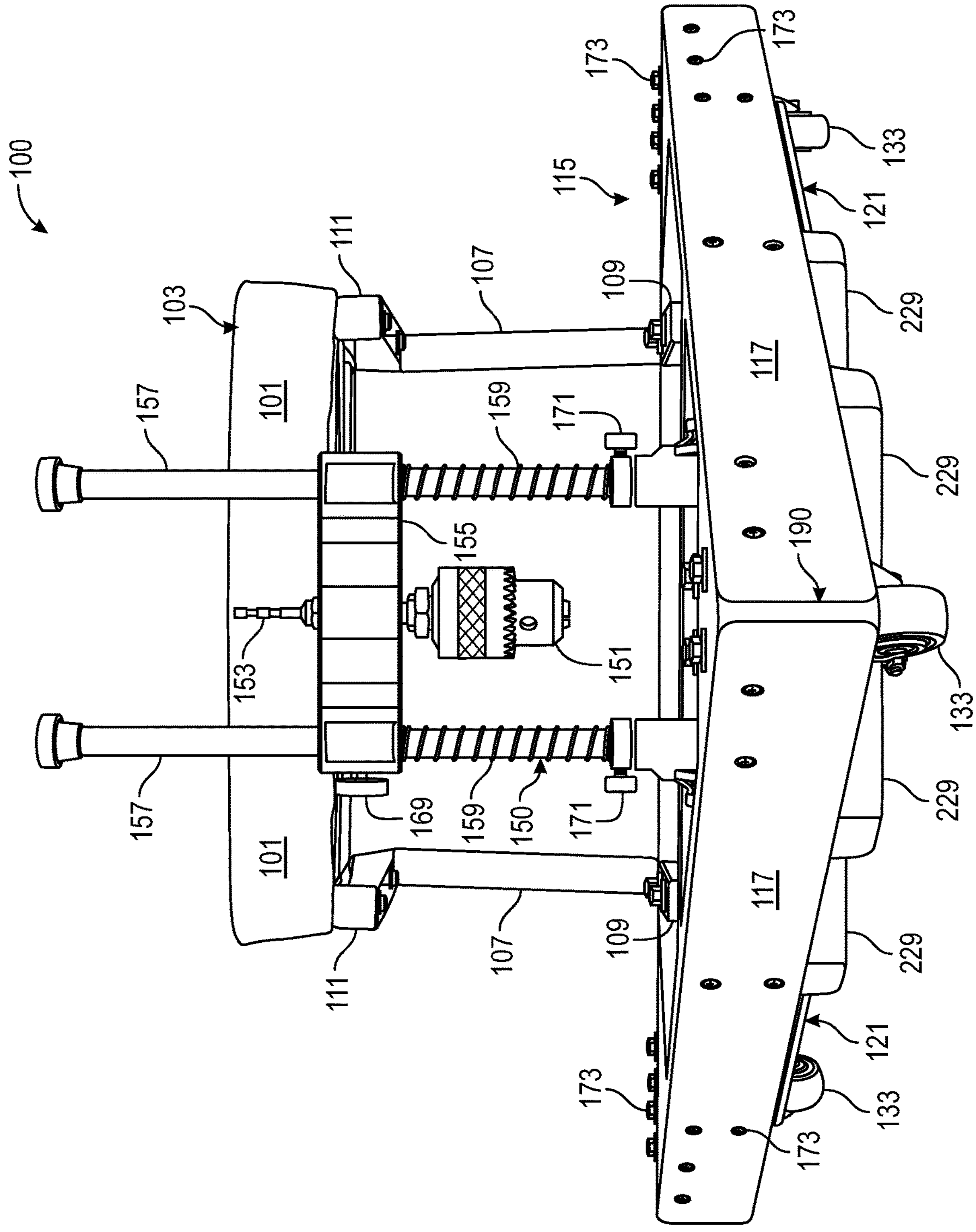
FIG. 2 depicts a front view of the creeper for ground work of FIG. 1.

FIG. 2 depicts a front view of creeper 100. In some embodiments, drill-guide 150 may be located closer to a front of creeper 100 than to a rear of creeper 100. In some embodiments, drill-guide 150 may be located closer to a front corner/point of creeper 100 than to the rear of creeper 100. In some embodiments, seat 101 may be located closer to the rear of creeper 100 than to the front of creeper 100. In some embodiments, drill-guide 150 may be located in front of and below seat 101. From FIG. 2, at least portions of all three movement-means 133 may be seen/shown. From FIG. 2, portions of two different and parallel bottom-frame 229 members may be seen/shown.

Continuing discussing FIG. 2, in some embodiments, base 115 may comprise one or more bottom-frame 229 members. In some embodiments, bottom-frame 229 members may be located within a boundary/perimeter defined by base-perimeter-frame 117. In some embodiments, a given bottom-frame 229 member may run from one side of base-perimeter-frame 117 to another/different side of base-perimeter-frame 117 and/or to a different bottom-frame 229 member. In some embodiments, terminal ends of bottom-frame 229 member may be attached to a side of base-perimeter-frame 117 and/or to a different bottom-frame 229 member via use of one or more fasteners 173, glues, adhesives, epoxies, welds, solvent bonds, ultrasonic welds, portions thereof, combinations thereof, and/or the like. In some embodiments, bottom-frame 229 member may be attached to floor 121, base-perimeter-frame 117, other/different bottom-frame 229 member(s) via use of one or more fasteners 173, glues, adhesives, epoxies, welds, solvent bonds, ultrasonic welds, portions thereof, combinations thereof, and/or the like. In some embodiments, bottom-frame 229 member may be an elongate structural member. In some embodiments, the elongate structural member of bottom-frame 229 member may be hollow, solid, portions thereof, combinations thereof, and/or the like. In some embodiments, the elongate structural member of bottom-frame 229 member may be at least substantially/mostly linear and/or straight. In some embodiments, bottom-frame 229 may provide structural support, reinforcement, and/or rigidity to drill-guide 150, floor 121, to base-perimeter-frame 117, and/or to creeper 100 in general. In some embodiments, bottom-frame 229 members may be substantially parallel with each other (see e.g., FIG. 5). In some embodiments, bottom-frame 229 members may be substantially parallel with each other and/or with a rear side/edge of base-perimeter-frame 117 (see e.g., FIG. 5). In some embodiments, two different and parallel bottom-frame 229 members may be spaced apart from each other by a width and/or length of base 161 of drill-guide 150. In some embodiments, bottom-frame 229 member may provide a (reinforced) location for mounting base 161 of drill-guide 150.

Figure 3:
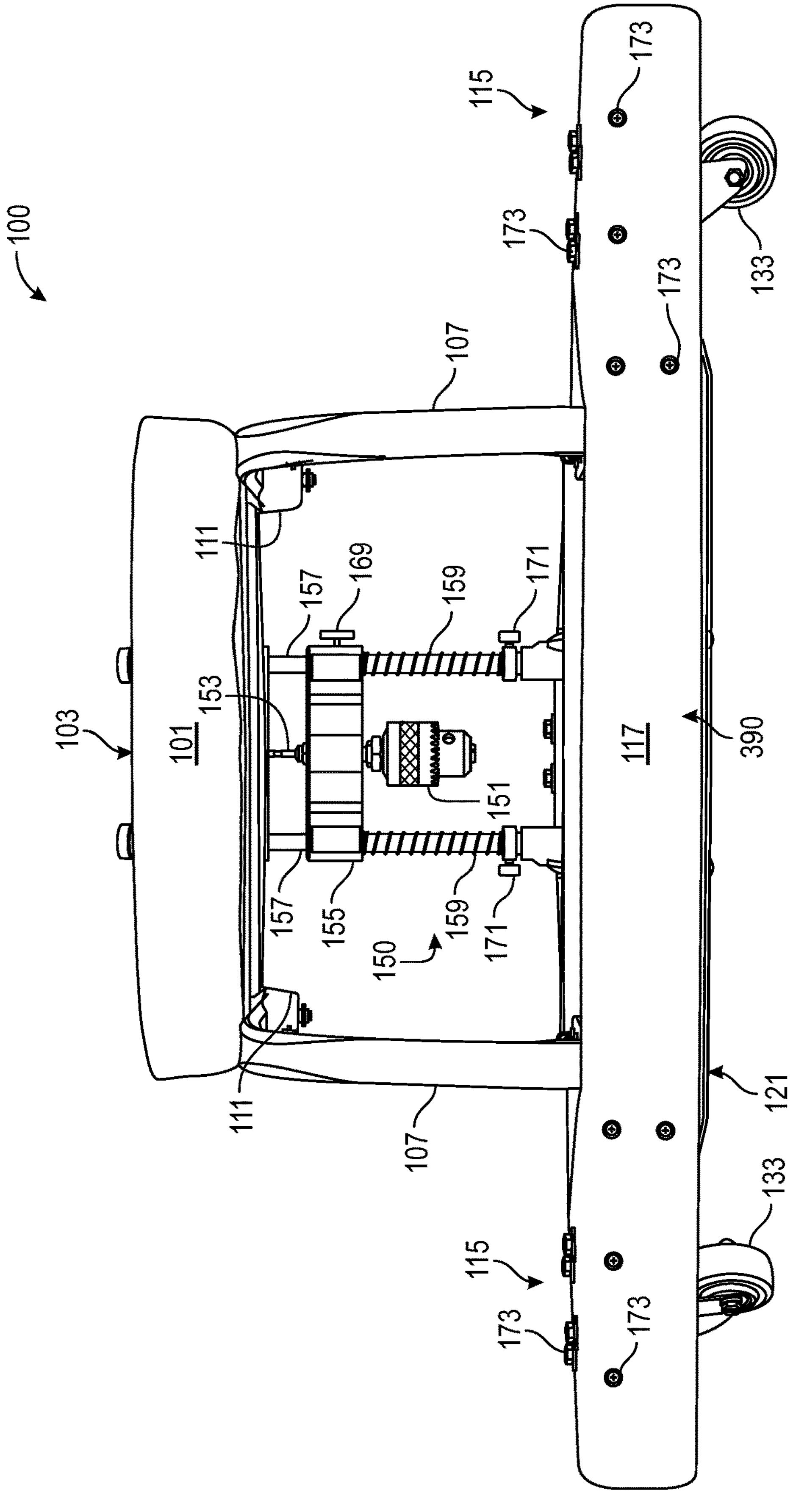
FIG. 3 depicts a back (rear) view of the creeper for ground work of FIG. 1.

FIG. 3 depicts a back (rear) view of creeper 100. In some embodiments, seat 101 may be located closer to a rear exterior, perimeter edge of creeper 100 and/or of a rear exterior, perimeter edge base-perimeter-frame 117 (which may be a straight edge of a polygon), than to the front of creeper 100.

Figure 4:
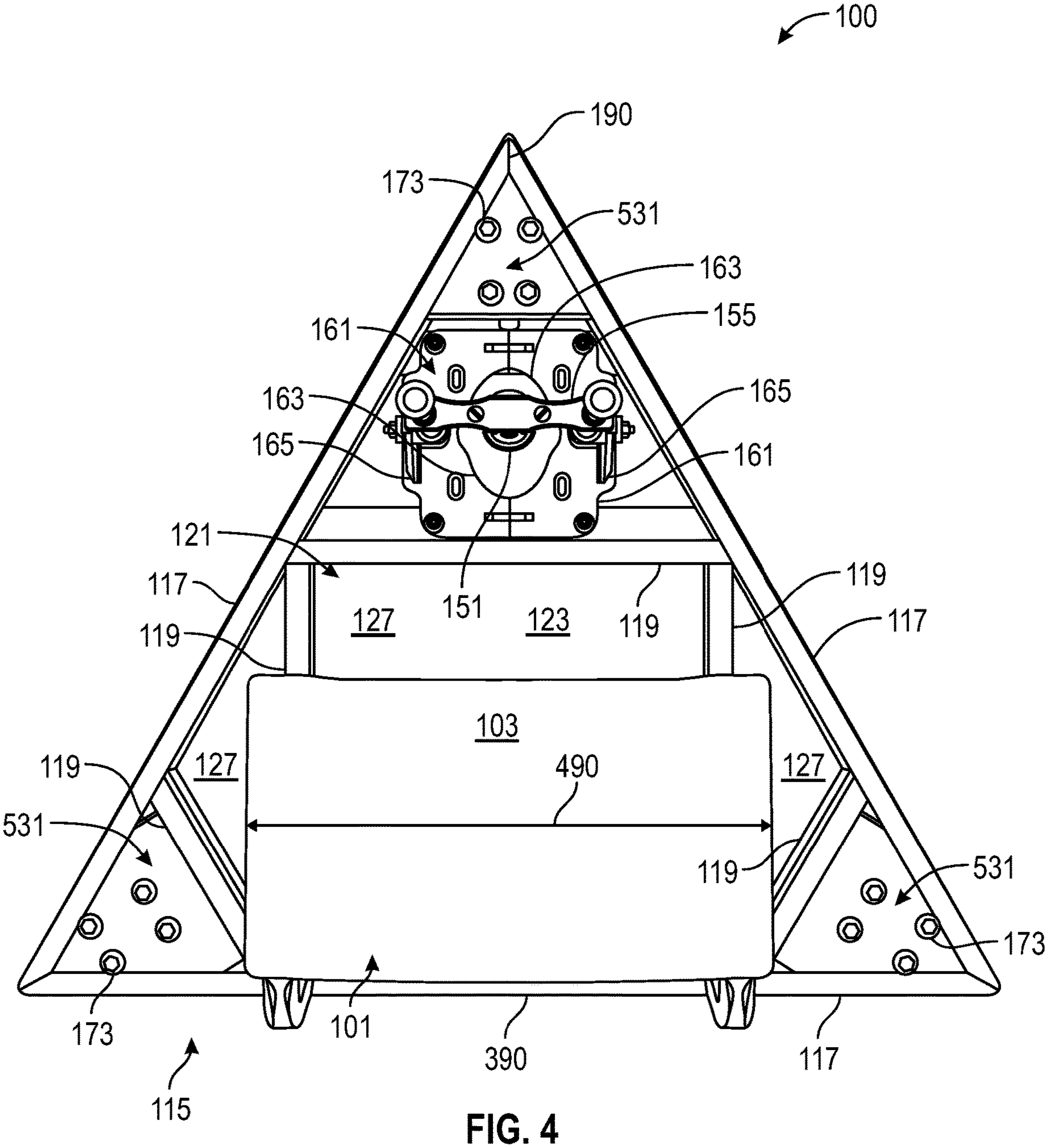
FIG. 4 depicts a top view of the creeper for ground work of FIG. 1.

FIG. 4 depicts a top view of creeper 100. Seat-top 103 of seat 101 may be seen in FIG. 1 and in FIG. 4. Openings to the compartment(s) 127 may be seen/shown in FIG. 4. In some embodiments, the larger central compartment 127, as viewed from the top, may have a shape that substantially/mostly resembles a polygon, such as, but not limited to, a square, a rectangle, and/or a parallelogram (see e.g., FIG. 1 and FIG. 4). In some embodiments, the flanking smaller compartment 127, as viewed from the top, may have a shape that substantially/mostly resembles a polygon, such as, but not limited to, a triangle (see e.g., FIG. 1 and FIG. 4). Most of main-opening 163 of base 161 of drill-guide 150 may be seen in FIG. 4. Portions (e.g., rear portions) of horizontal-member(s) 111 and/or of vertical-member(s) 107 may extend beyond/past the rear outside edge of base-perimeter-frame 117 as shown in FIG. 4. In some embodiments, all of the outside edges of base-perimeter-frame 117 may be of a same fixed and predetermined length. In some embodiments, each outside edge of base-perimeter-frame 117 may be of a fixed and predetermined length, such as, but not limited to thirty-two (32) inches, plus or minus two (2) inches. For example, FIG. 4 shows three such outside edges of base-perimeter-frame 117 that generally resemble a shape of a polygon, such as, but not limited to, a triangle. In other embodiments, these outside edges of base-perimeter-frame 117 may be other than thirty-two (32) inches, plus or minus two (2) inches.

Figure 5:
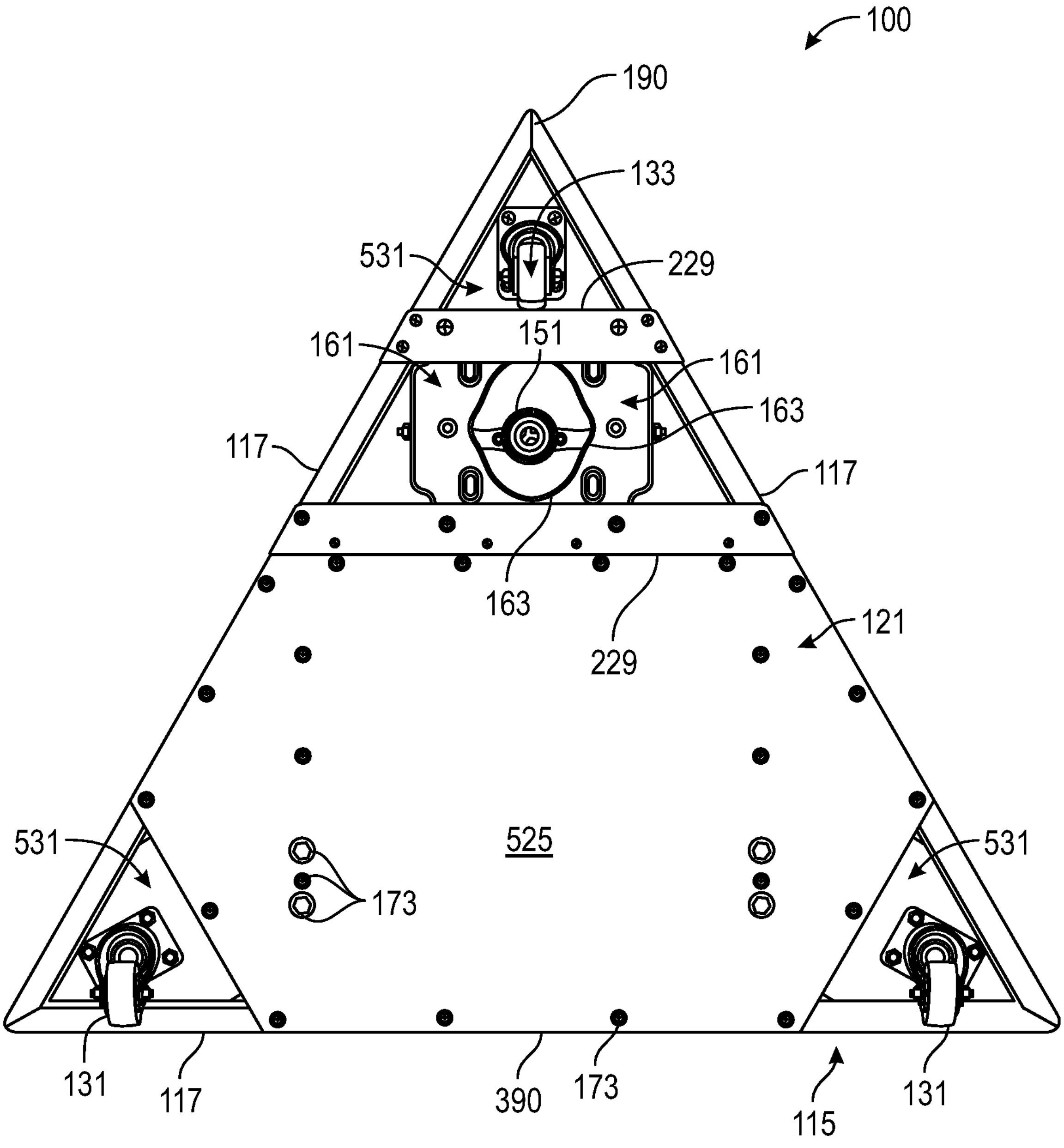
FIG. 5 depicts a bottom view of the creeper for ground work of FIG. 1.

FIG. 5 depicts a bottom view of creeper 100. FIG. 5 may show bottom portions of bottom-frame 229 member(s), floor-bottom 525, attachment-region(s) 531, movement-means 133, base 161, main-opening 163, chuck 151. FIG. 5 may show how the movement-means 133 are attached to base 115 (e.g., to attachment-region(s) 531). FIG. 5 may also show how each movement-means 133 is attached to base 115 in a recessed compartment formed by a given attachment-region 531, portions of base-perimeter-frame 117, and a portion of a given internal-frame 119 member, wherein this "recessed" direction is seen from the bottom view of FIG. 5.

Continuing discussing FIG. 5, in some embodiments, base 115 may comprise at least one attachment-region 531. In some embodiments, base 115 may comprise a quantity of attachment-region 531 that matches a quantity of movement-means 133. In some embodiments, attachment-region 531 may be a region/portion of base 115 that may be configured for receiving attachment of movement-means 133. In some embodiments, attachment-region 531 may be a thicker and/or reinforced region/portion of base 115 that may be configured for receiving attachment of movement-means 133. In some embodiments, attachment-region 531 may be located at a corner region of base 115 (e.g., when base 115 may be viewed from the bottom). In some embodiments, attachment-region 531 may be one or more structural, planar, and/or elongate members. In some embodiments, attachment-region 531 may be attached to base-perimeter-frame 117, internal-frame 119 member, floor 121, and/or bottom-frame 229 member (via use of one or more fasteners 173, glues, adhesives, epoxies, welds, solvent bonds, ultrasonic welds, portions thereof, combinations thereof, and/or the like). In some embodiments, movement-means 133 may be attached to attachment-region 531. In some embodiments, movement-means 133 may be attached to attachment-region 531 via use of one or more fasteners 173, glues, adhesives, epoxies, welds, solvent bonds, ultrasonic welds, portions thereof, combinations thereof, and/or the like.

Figure 6:
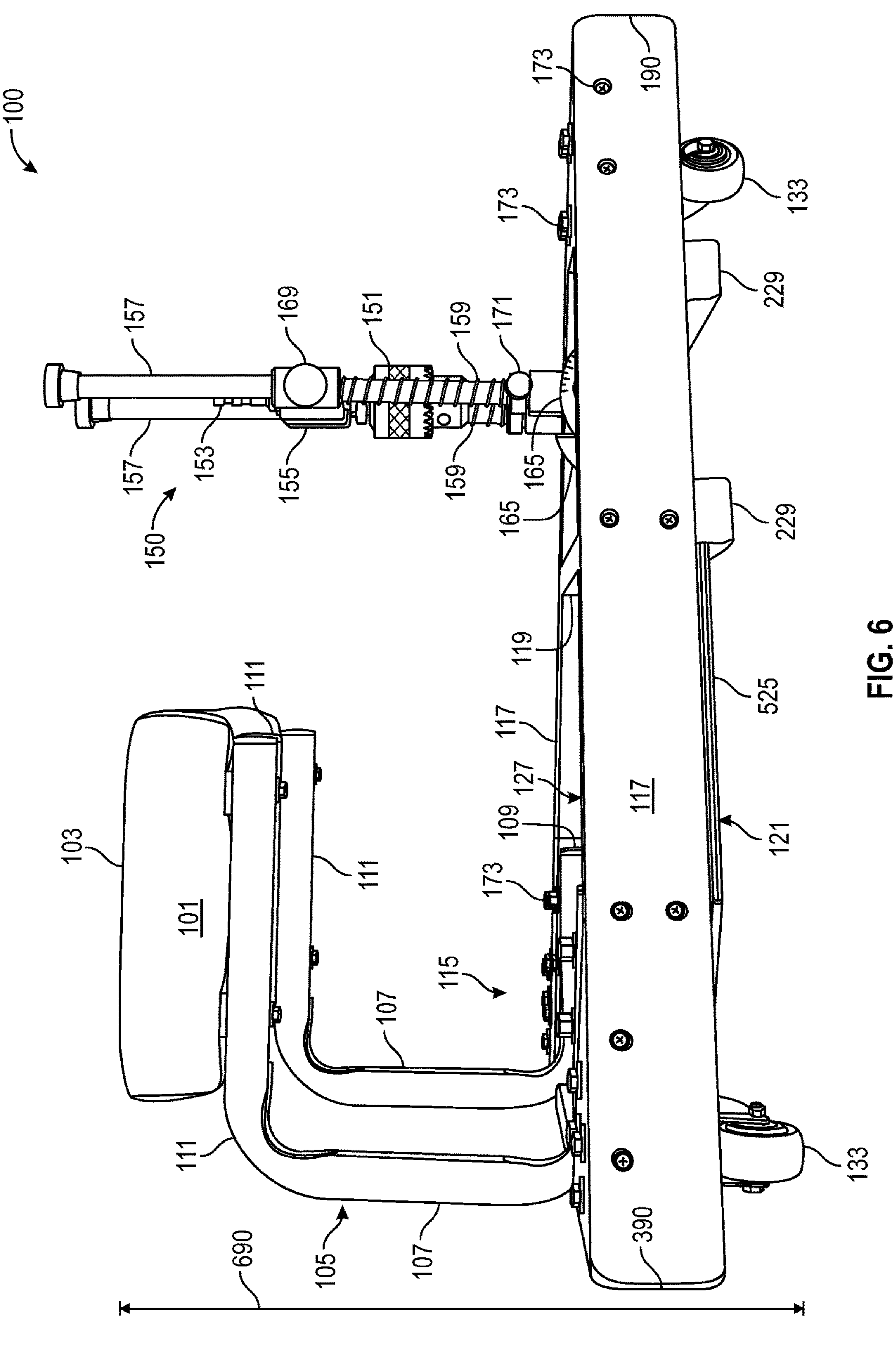
FIG. 6 depicts a right-side view of the creeper for ground work of FIG. 1.
Figure 7:
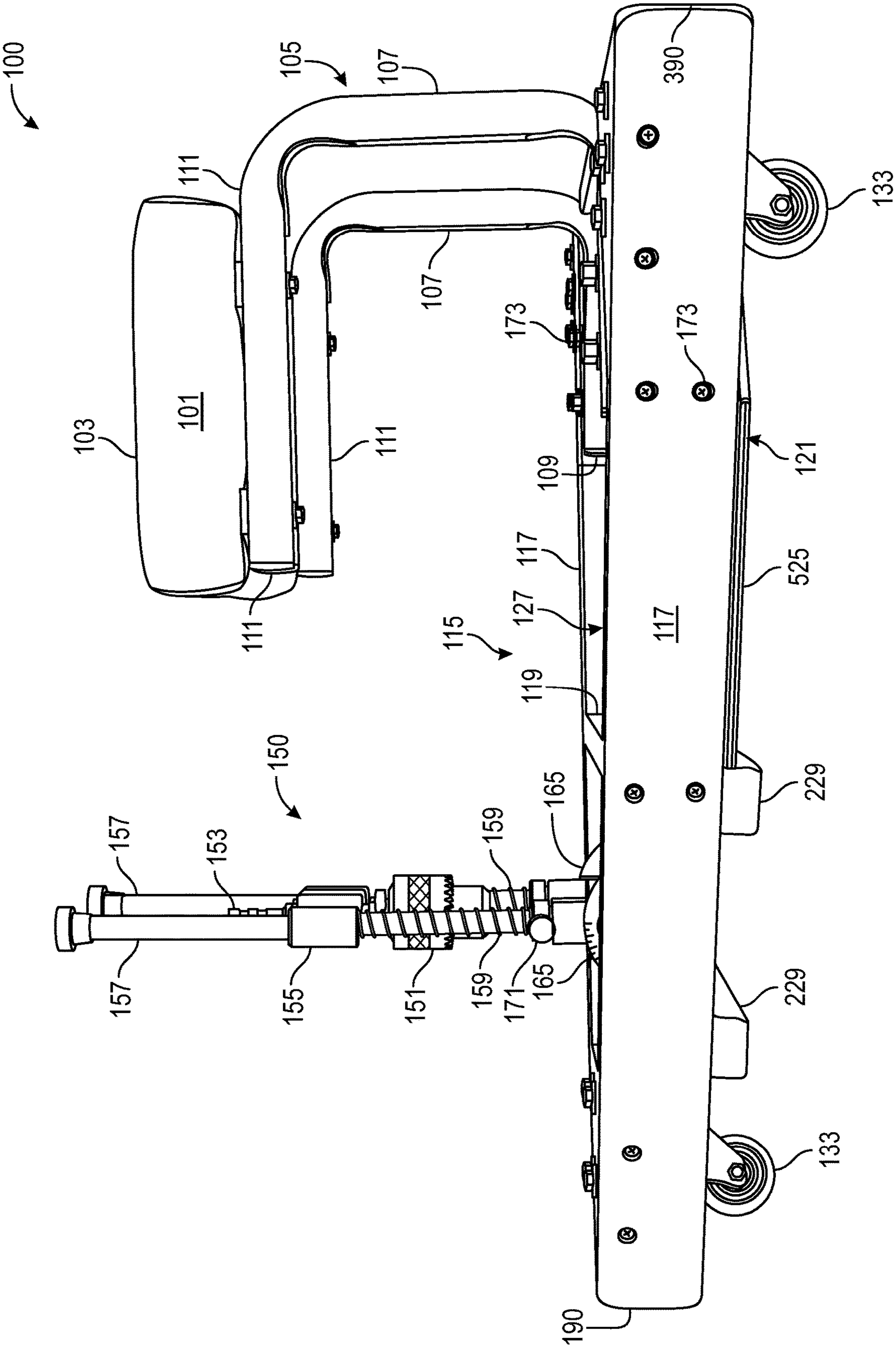
FIG. 7 depicts a left-side view of the creeper for ground work of FIG. 1.

FIG. 6 depicts a right-side view of creeper 100. FIG. 7 depicts a left-side view of creeper 100. FIG. 6 and FIG. 7 show the drill-guide 150 being in a vertical orientation/configuration (i.e., with protractor(s) 165 angle selected/set to zero (0) degrees). FIG. 6 and FIG. 7 show the drill-guide 150 being located closer to front 190 of creeper 100 (or the front of base-perimeter-frame 117) than to rear 390 of creeper 100 (or the rear of 117). FIG. 6 and FIG. 7 show seat 101 being located closer to rear 390 of creeper 100 (or the rear of 117) than to front 190 of creeper 100 (or the front of base-perimeter-frame 117). FIG. 6 and FIG. 7 show the drill-guide 150 being located (disposed) between two parallel bottom-frame 229 members (at least when the guide-rail(s) 157 are in the vertical orientation as shown in FIG. 6 and in FIG. 7). In some embodiments, seat-top 103 may be at a fixed and a predetermined height (e.g., seat-height 690) from a bottom of movement-means 133. In some embodiments, seat-top 103 may be fourteen (14) inches, plus or minus two (2) inches, from the bottom of movement-means 133. In some embodiments, seat-height 690 may be fourteen (14) inches, plus or minus two (2) inches. In other embodiments, seat-height 690 may be a different dimension. In some embodiments, the seat-attachment-means may be at least one elongate structural member that is substantially shaped as an upper-case letter "U" when creeper 100 is viewed from a right-side or from a left-side. In some embodiments, a top opening of that upper-case letter "U" shape is facing a front of creeper 100 and a closed bottom-end of that upper-case letter "U" shape is facing a rear of creeper 100 (see e.g., FIG. 6 or FIG. 7).

Figure 8:
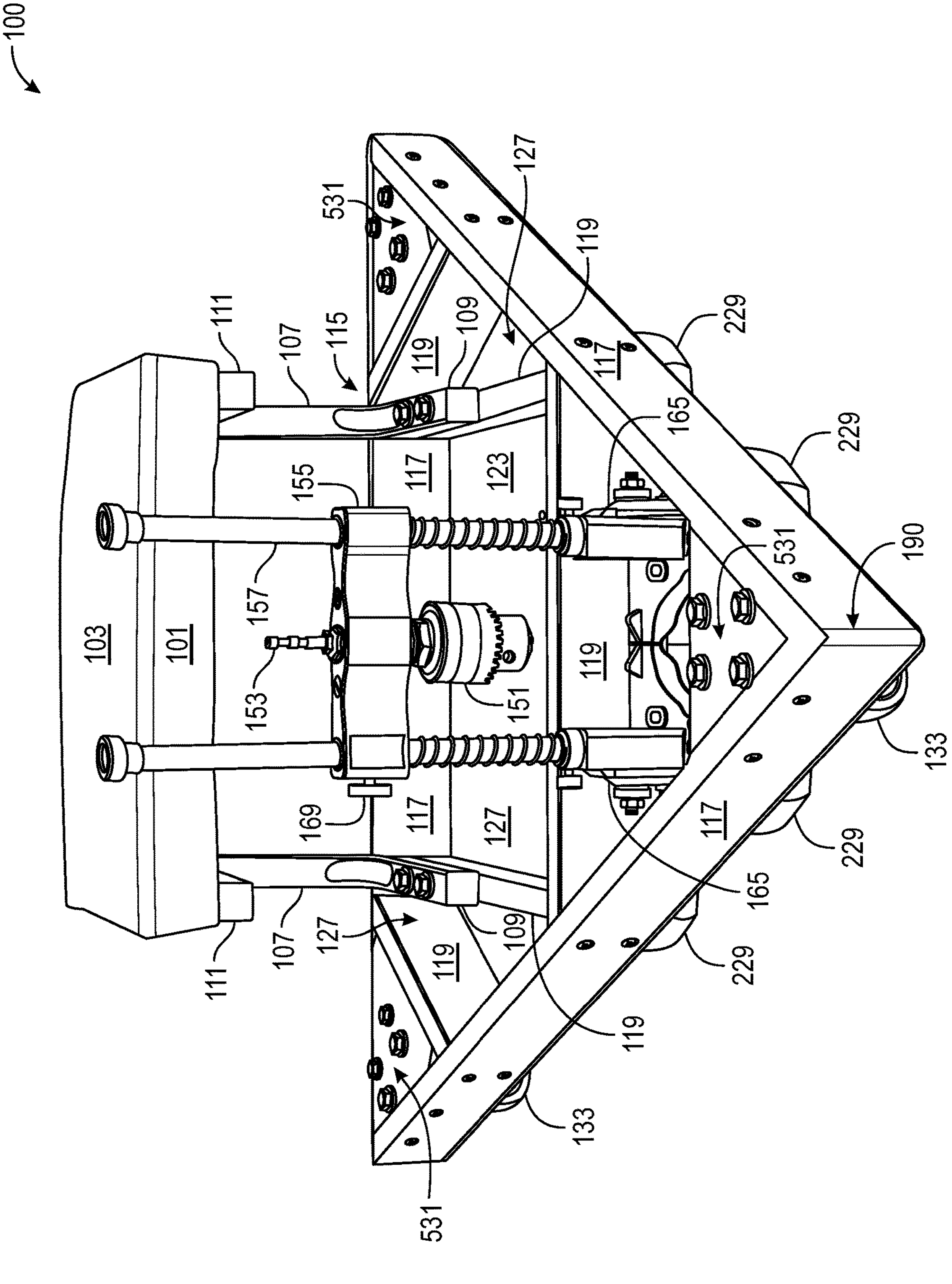
FIG. 8 depicts a top front perspective view of the creeper for ground work of FIG. 1.
Figure 9:
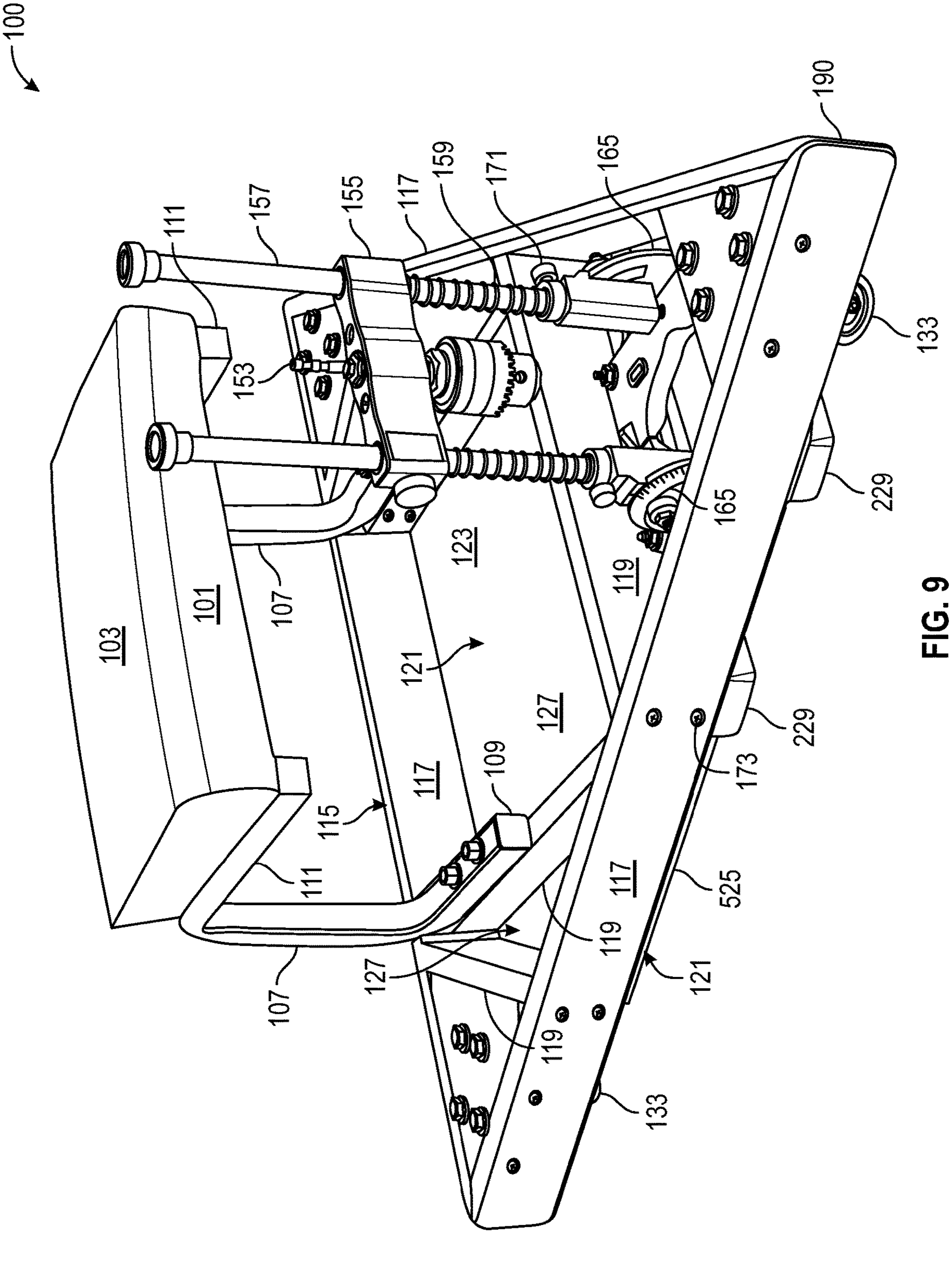
FIG. 9 depicts a top right perspective view of the creeper for ground work of FIG. 1.

FIG. 8 depicts a top front perspective view of creeper 100. FIG. 9 depicts a top right perspective view of creeper 100. In general, the above discussions of FIG. 1, also a perspective view, are applicable to FIG. 8 and to FIG. 9.

Figure 10:
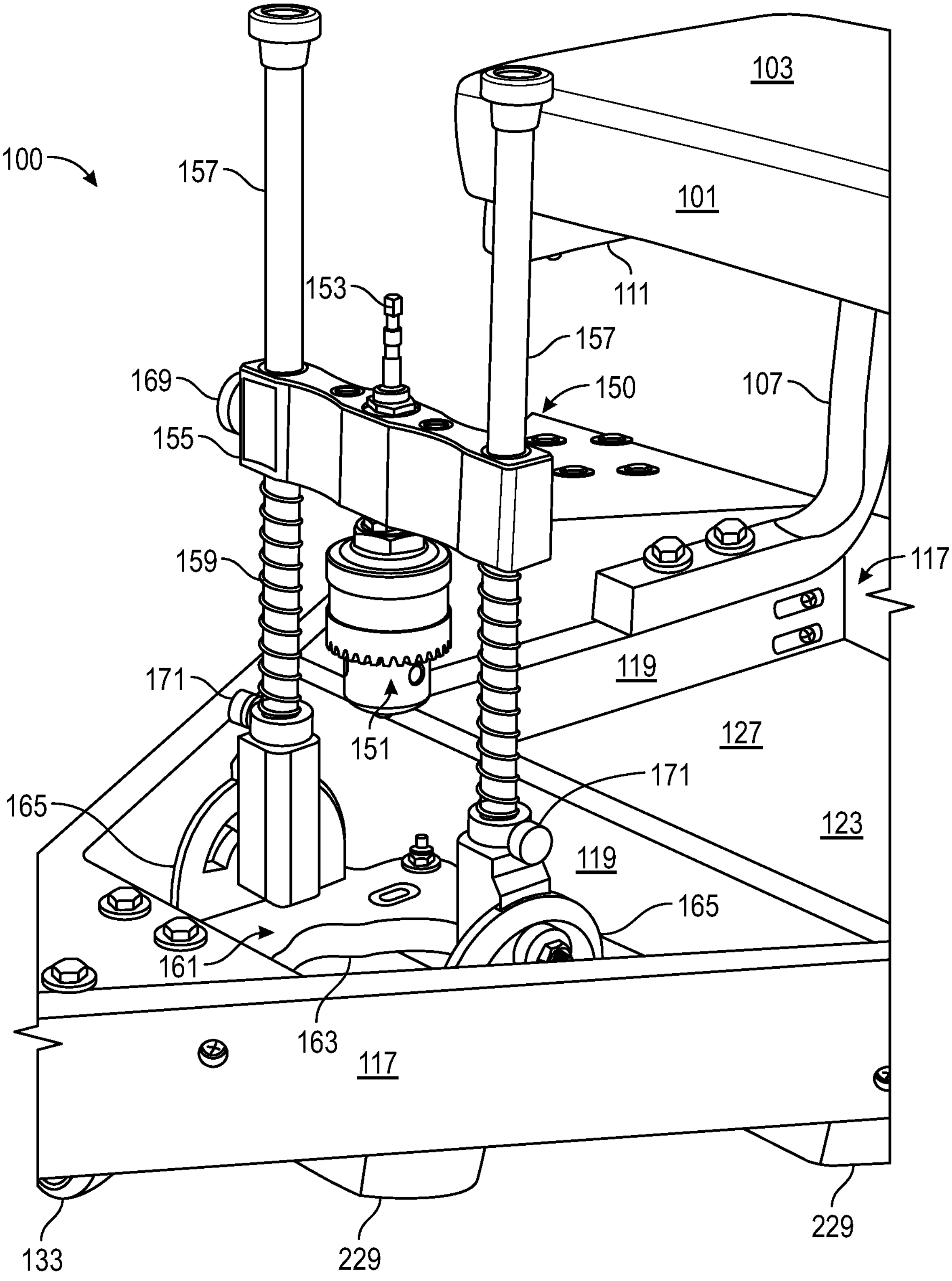
FIG. 10 depicts a front portion of the creeper for ground work of FIG. 1 from a closeup front and left-side perspective view.

FIG. 10 depicts a front portion of creeper 100 from a closeup front and left-side perspective view. FIG. 10 shows a closer up view of drill-guide 150 as compared to the previous FIG. 1-FIG. 9. The above FIG. 1 discussion of drill-guide 150 and its components, structures, functions, and purposes is also applicable to FIG. 10.

Figure 11:
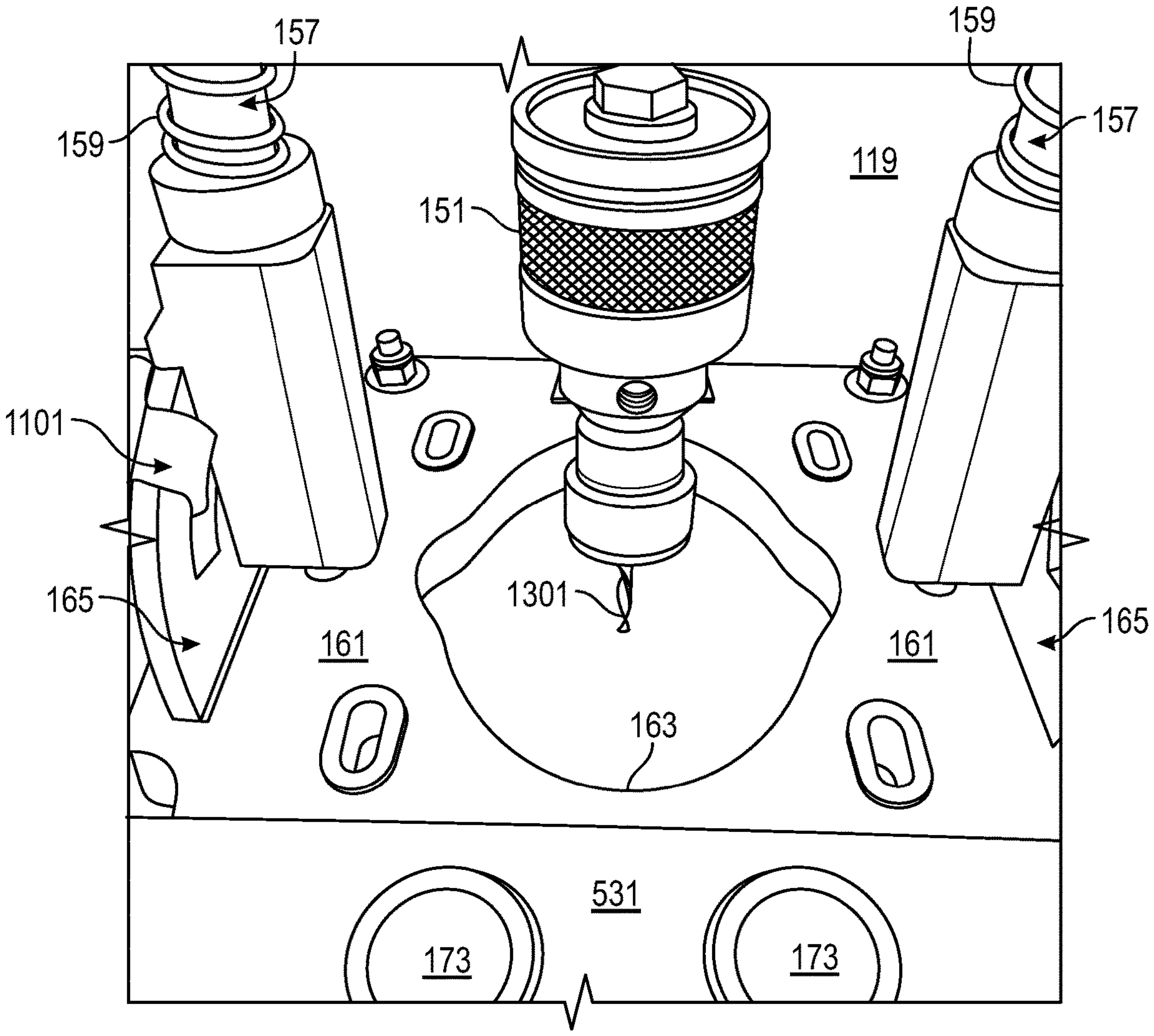
FIG. 11 depicts a front portion of the creeper for ground work of FIG. 1 from a closeup front and front perspective view.

FIG. 11 depicts a front portion of creeper 100 from a closeup front and front perspective view. FIG. 11 shows a leash 1101. In some embodiments, leash 1101 may be configured to (removably) connect a chuck-key 1401 to some portion of: creeper 100, base 115, base-perimeter-frame 117, drill-guide 150, base 161, portions thereof, combinations thereof, and/or the like. In some embodiments, leash 1101 may be of a fixed length. In some embodiments, leash 1101 may be flexible. In some embodiments, leash 1101 may be elastic. In some embodiments, creeper 100, base 115, base-perimeter-frame 117, drill-guide 150, or base 161 may comprise leash 1101. FIG. 11 may also show a drill-bit 1303 attached to chuck 151.

Figure 12:
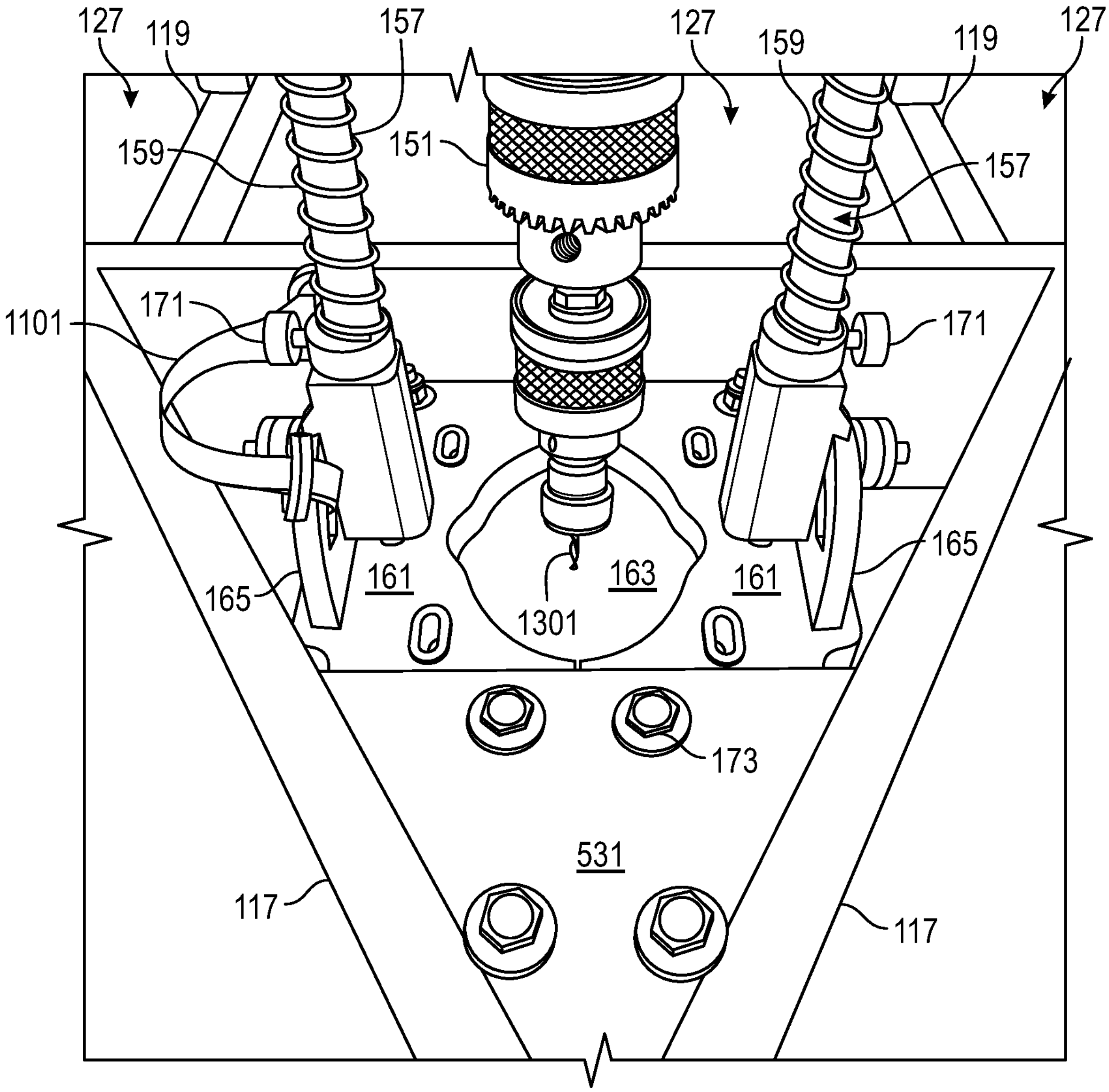
FIG. 12 depicts a front portion of the creeper for ground work of FIG. 1 from a closeup front and front perspective view.

FIG. 12 depicts a front portion of creeper 100 from a closeup front and front perspective view. FIG. 12 is more of a closeup view than FIG. 11. A portion of leash 1101 is visible in FIG. 12. And drill-bit 1303 (that is attached to chuck 151) is shown in FIG. 12, but chuck 151 is now shown in FIG. 12 because of the closeup view of FIG. 12.

Figure 13:
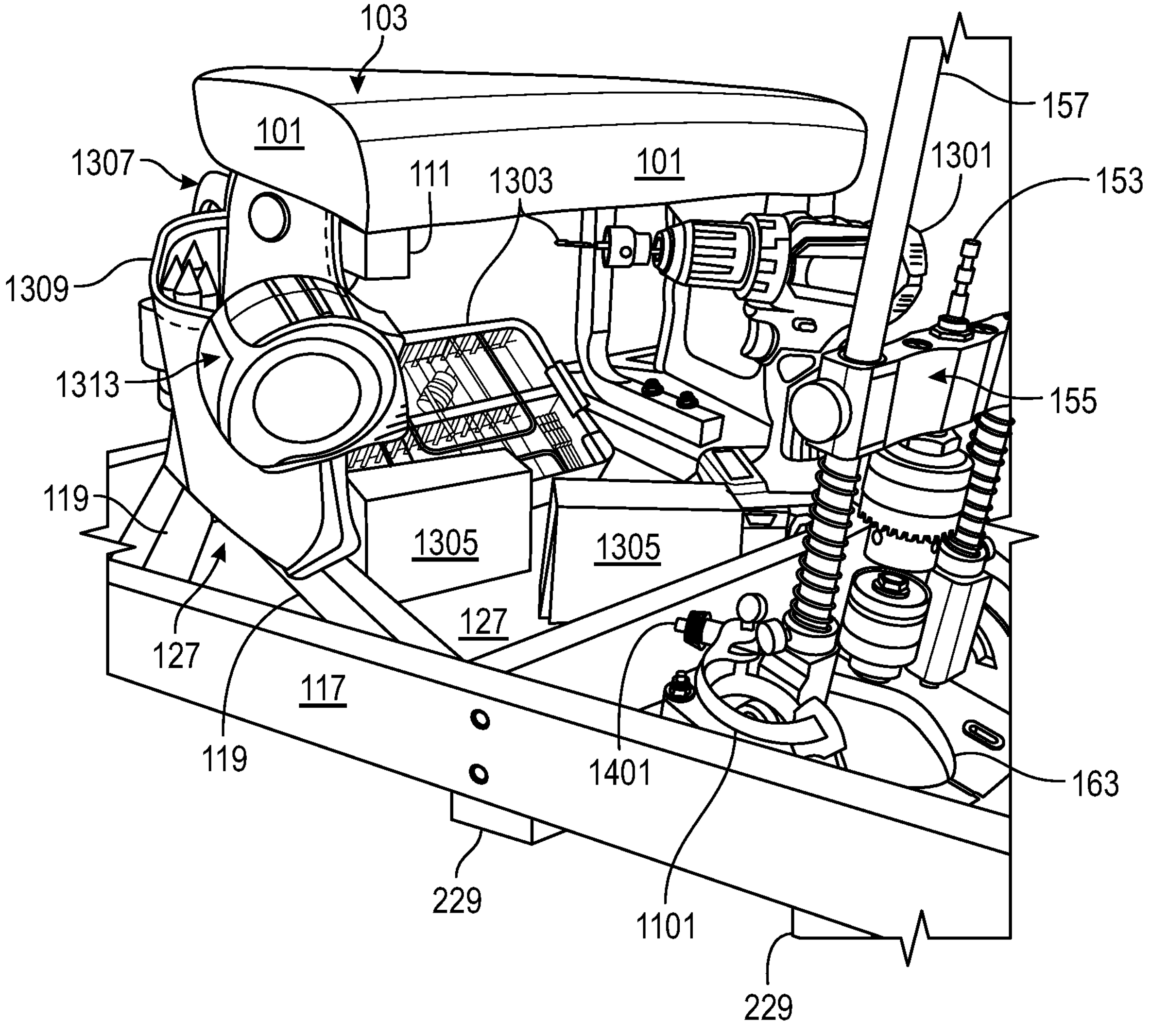
FIG. 13 depicts a portion of the creeper for ground work of FIG. 1 from a partial perspective view, along with showing various accessories that may be used with the creeper for ground work of FIG. 1.

FIG. 13 depicts a portion of creeper 100 from a partial perspective view, along with showing various accessories that may be used with creeper 100. FIG. 13 shows drill 1301, drill-bit(s) (and/or drivers) 1303, fastener(s) 1305, saddle-bag(s) 1307, writing-implement 1311, and measurement-tool 1313 as various example accessories that may be used with creeper 100.

Continuing discussing FIG. 13, in some embodiments, drill 1301 may be an electrically powered drill and/or an electrically powered impact driver. In some embodiments, drill 1301 may be a cordless drill or a corded drill. In some embodiments, drill 1301 may be a cordless impact driver or a corded impact driver. In some embodiments, drill 1301 may be a hand-powered drill. In some embodiments, arbor/shank 153 of drill-guide 150 may be configured to be (removably) received into a chuck of drill 1301.

Continuing discussing FIG. 13, in some embodiments, drill-bit(s) 1303 (and/or driver bit(s)) may be one or more items configured to be received into chuck 151 at one end and to drill a hole or drive a fastener 1305. Drill-bits 1303 may create predrilled holes (in decking and/or in joists). Driver-bits may engage, drive, push, and/or force (screw) fasteners (e.g., fastener(s) 1305) into various substrates, work surfaces, and/or predrilled holes.

Continuing discussing FIG. 13, in some embodiments, fastener(s) 1305 may be configured to be driven by driver-bits used in chuck 151 and powered by a (handheld) drill driver 1301. In some embodiments, fastener(s) 1305 may be configured to attach decking planks to joists. FIG. 13 may show boxes of fasteners 1305. In some embodiments, fastener(s) 1305 may be screws, bolts, rivets, nails, brads, staples, and/or the like.

Continuing discussing FIG. 13, in some embodiments, saddle-bag(s) 1307 may be a storage device configured to be attached to creeper 100. In some embodiments, creeper 100, the seat-attachment-means, and/or seat-frame 105 may comprise at least one saddle-bag 1307. In some embodiments, the at least one saddle-bag 1307 may comprise at least one pocket 1309. In some embodiments, saddle-bag 1307 may be a saddle-bag. In some embodiments, saddle-bag 1307 may be a bag with at least one pocket 1309. In some embodiments, saddlebag(s) 1307 may be attached to seat-frame 105. In some embodiments, saddle-bag(s) 1307 may be attached to horizontal-member 111 of the seat-attachment-means and/or of seat-frame 105. In some embodiments, saddle-bag(s) 1307 and/or pocket(s) 1309 may be configured for removable storage of accessories of creeper 100 and/or of tools. In some embodiments, creeper 100, seat-frame 105, and/or horizontal-member 111 may comprise at least one saddle-bag 1307. In some embodiments, creeper 100 and/or seat-frame 105 may comprise at least two saddle-bags 1307, one per horizontal-member 111. In some embodiments, two saddle-bags 1307 may be spaced apart from each other by about seat-width 490 of seat 101 (see e.g., FIG. 13). See also FIG. 15 for saddle-bag(s) 1307.

Continuing discussing FIG. 13, in some embodiments, writing-implement(s) 1311 may be one or more: a pencil, a pen, a marker, a highlighter, a paint marker, a spray can, spray paint, marking paint, chalk, a chalk line tool, portions thereof, combinations thereof, and/or the like.

Continuing discussing FIG. 13, in some embodiments, measurement-tool(s) 1313 may be a tool for measuring things, a tool for taking measurements of things, and/or a tool for making measurements of things. In some embodiments, measurement-tool(s) 1313 may be a tape measurer. In some embodiments, measurement-tool(s) 1313 may be a laser measurer. In some embodiments, measurement-tool(s) 1313 may be a laser range/distance finder.

Figure 14:
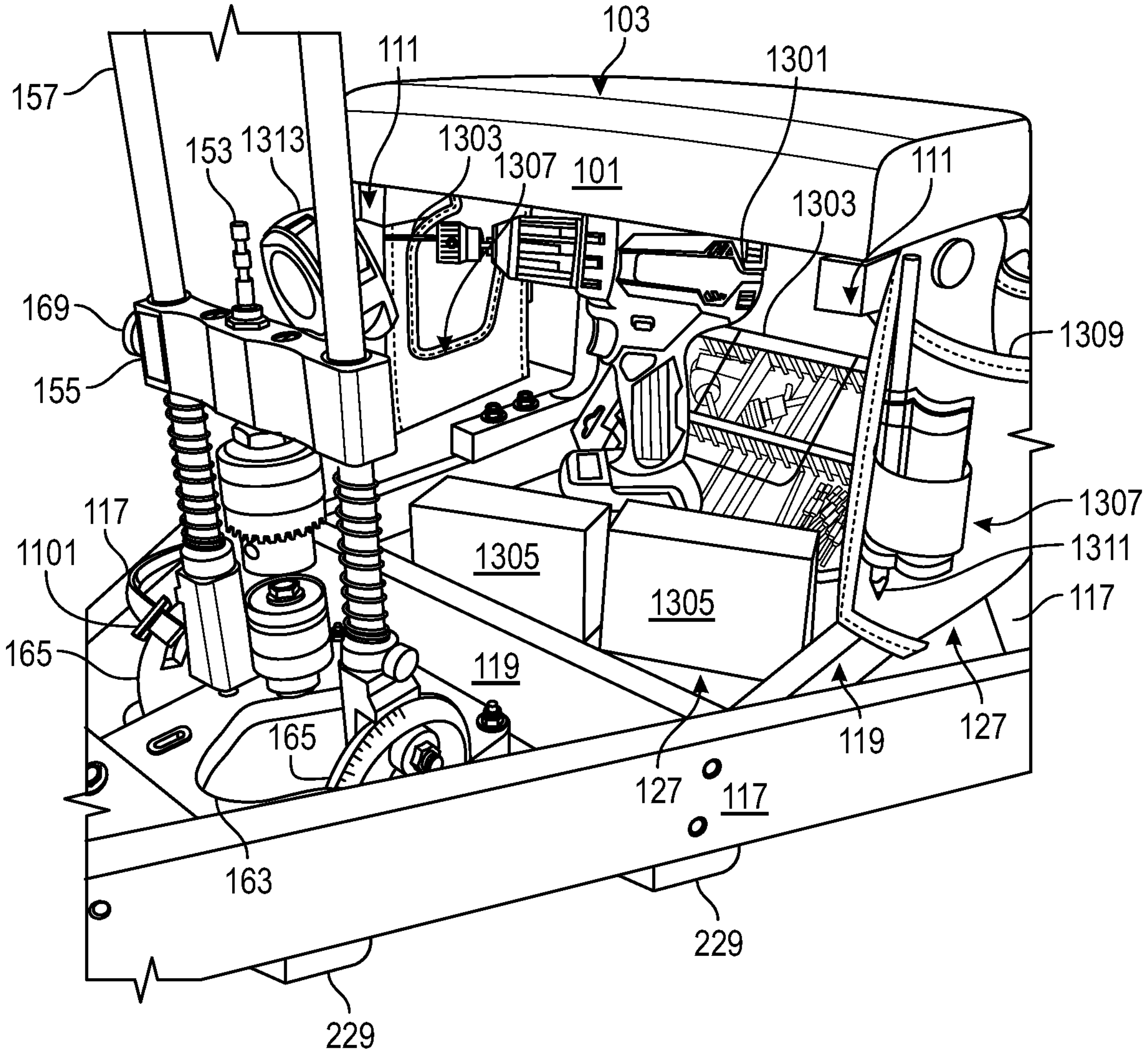
FIG. 14 depicts a portion of the creeper for ground work of FIG. 1 from another partial perspective view, along with showing various accessories that may be used with the creeper for ground work of FIG. 1.

FIG. 14 depicts a portion of creeper 100 from another partial perspective view, along with showing various accessories that may be used with creeper 100. FIG. 14 may show chuck-key 1401. In some embodiments, chuck-key may be a chuck key for chuck 151. In some embodiments, the chuck key for chuck 151 may loosen or tighten chuck 151. In some embodiments, the chuck key for chuck 151 may loosen or tighten chuck 151 so that a drill-bit (or driver) 1303 may be removed from chuck 151 or that the drill-bit (or driver) 1303 may be secured to chuck 151. In some embodiments, creeper 100, base 115, base-perimeter-frame 117, drill-guide 150, and/or a portion thereof may comprise chuck-key 1401. In some embodiments, chuck-key 1401 may be (removably) attached to creeper 100, base 115, base-perimeter-frame 117, drill-guide 150, and/or the portion thereof via use of leash 1101.

Figure 15:
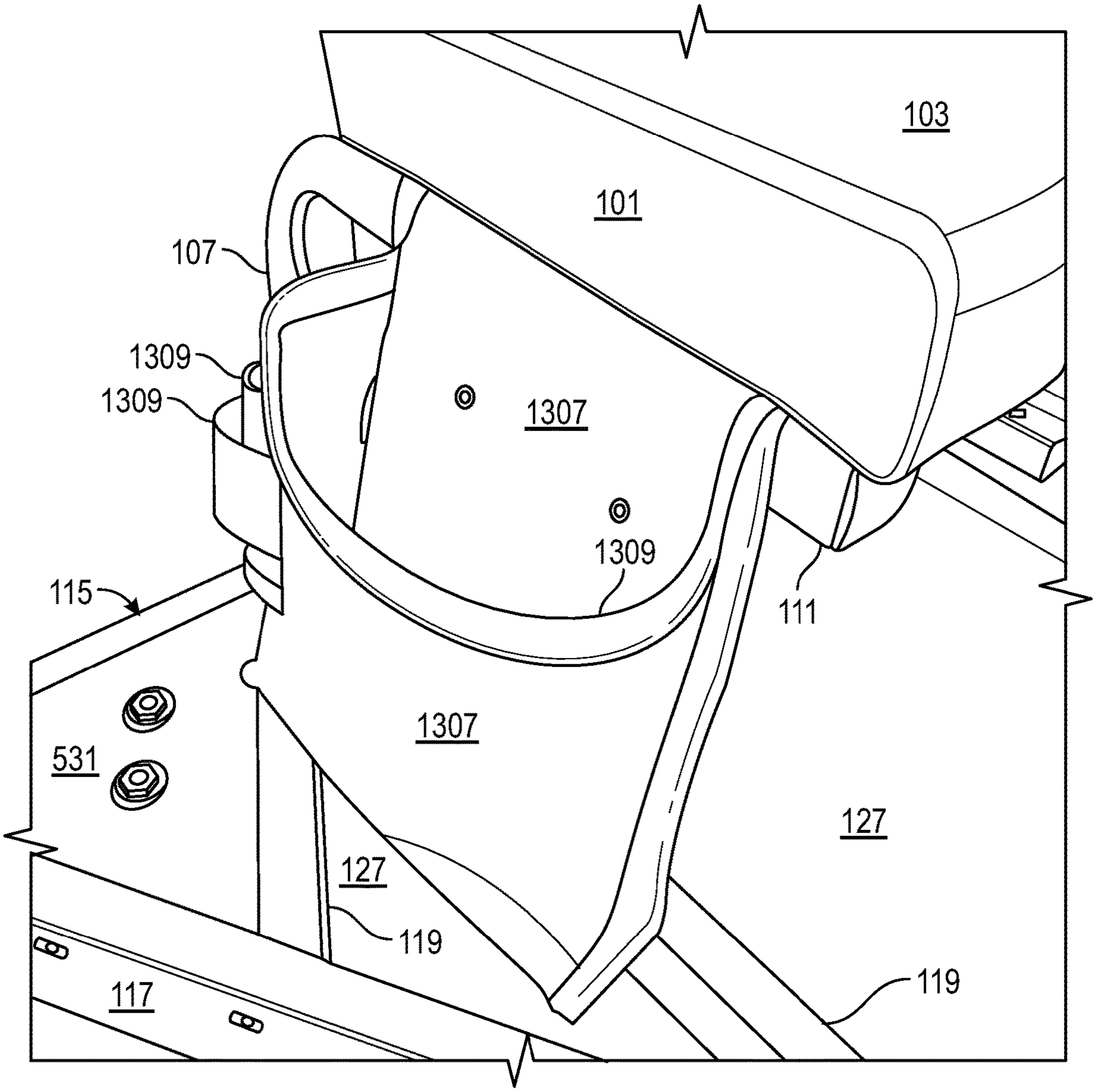
FIG. 15 depicts a portion of the creeper for ground work of FIG. 1 from yet another partial perspective view, along with showing various accessories that may be used with the creeper for ground work of FIG. 1.

FIG. 15 depicts a portion of creeper 100 from yet another partial perspective view, along with showing various accessories that may be used with creeper 100. FIG. 15 may show a given saddle-bag 1307 attached to a horizontal-member 111 of seat-frame 105 of creeper 100. A main (largest) pocket 1309 of this saddle-bag 1307 may be seen in FIG. 15. In some embodiments, pocket 1309 may be accessed from a top.

Figure 16:
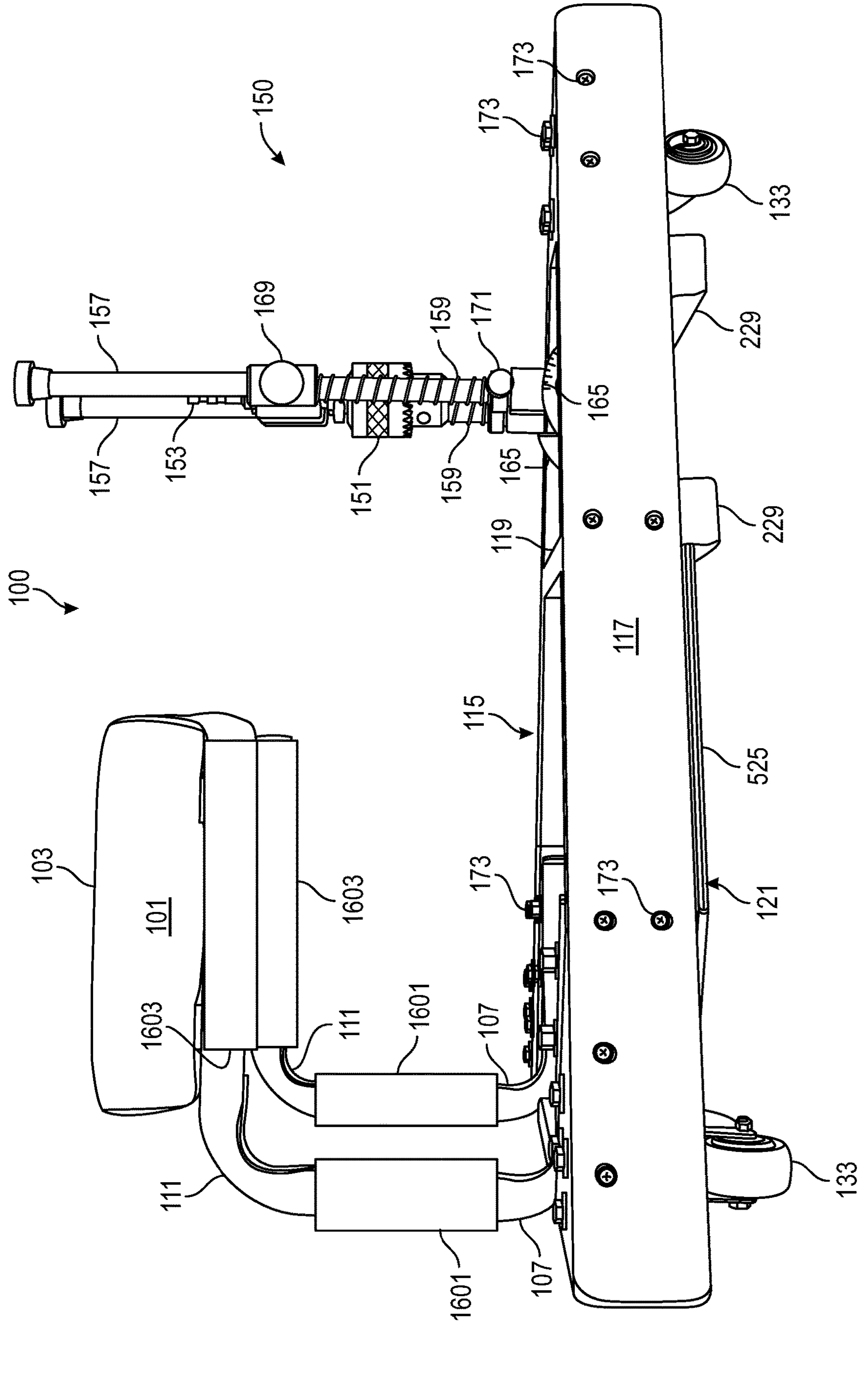
FIG. 16 depicts a right-side view of the creeper for ground work that may have a seat that is positionally adjustable.

FIG. 16 depicts a right-side view of the creeper for ground work that may have a seat that is positionally adjustable. The creeper shown in FIG. 16 may be substantially similar to creeper 100 shown in FIG. 1-15, except the FIG. 16 creeper may have an adjustable seat 101. In some embodiments, the seat-attachment-means may be adjustable in an up-down direction, that is substantially parallel with the vertical direction, so that seat 101 is lockably positionable within a predetermined and finite range from base 115. In some embodiments, vertical (up or down) adjustments of seat 101 may be done by vertical-adjuster 1601. In some embodiments, seat-frame 105 and/or vertical-member 107 may comprise vertical-adjuster 1601. In some embodiments, vertical-adjuster 1601 may be an adjustable and lockable telescoping member. In some embodiments, the seat-attachment-means is adjustable in a front-rear direction of creeper 100, that is substantially perpendicular to the vertical direction, so that seat 101 is lockably positionable within a predetermined and finite range from a rear of base 115. In some embodiments, forwards or backwards adjustments of seat 101 may be done by forwards-backwards-adjuster 1603. In some embodiments, seat-frame 105, horizontal-member 111, and/or base-member 109 may comprise forwards-backwards-adjuster 1603. In some embodiments, forwards-backwards-adjuster 1603 may be an adjustable and lockable telescoping member.

In some embodiments, creeper 100, seat 101 internal components, seat bottom, seat-frame 105, vertical-member 107, base-member 109, horizontal-member 111, base 115, base-perimeter-frame 117, internal-frame 119 member, floor 121, floor-top 123, floor-bottom 525, compartment 127, bottom-frame member 229, attachment-region 531, movement-means 133, drill-guide 150, carriage 155, guide-rail 157, base 161, protractor 165, adjuster 169, adjuster 171, fastener 173, portions thereof, combinations thereof, and/or the like, may be at least partially to fully constructed from one or more: metals, plastics, thermoformed plastics, injection molded material, extruded materials, 3D (three dimensional) printed materials, stamped materials, plastic based foams, rigid plastic foam, polymers, wood, laminates, composite, portions thereof, combinations thereof, and/or the like.

In some embodiments, creeper 100, seat bottom, seat-frame 105, vertical-member 107, base-member 109, horizontal-member 111, base 115, base-perimeter-frame 117, internal-frame 119 member, floor 121, floor-top 123, floor-bottom 525, compartment 127, bottom-frame member 229, attachment-region 531, movement-means 133, drill-guide 150, carriage 155, guide-rail 157, base 161, protractor 165, adjuster 169, adjuster 171, fastener 173, portions thereof, combinations thereof, and/or the like, may be at least partially to fully painted, powder coated, coated in plastic, coated in rubber, coated in elastomer, portions thereof, combinations thereof, and/or the like.

In some embodiments, the invention may be of a system and/or of a kit. In some embodiments, this system/kit may comprise at least one creeper 100 (with or without drill-guide 150). In some embodiments, this system/kit may comprise at least one creeper 100 (without drill-guide 150) and a drill-guide 150. In some embodiments, this system/kit may comprise at least one creeper 100 (with or without drill-guide 150) and one or more of: drill 1301, drill-bits 1303 and/or driver-bits, fastener(s) 1305, saddle-bag(s) 1307, pocket(s) 1309, writing-implement(s) 1311, measurement-tool(s) 1313, chuck-key 1401, portions thereof, combinations thereof, and/or the like.

In some embodiments, creeper 100 may be as described above, except drill-guide 150 may be omitted; and one may add in a drill guide or the like if so desired or not.

Note, FIG. 1 through and including FIG. 14 all show the drill-guide 150 being in the vertical orientation/configuration (i.e., with protractor(s) 165 angle selected/set to zero (0) degrees).

Note, no humans nor portions thereof are claimed. And claims should not be interpreted to claiming a human or a portion thereof. However, humans may use the embodiments disclosed and discussed herein. And the embodiments disclosed and discussed herein may be configured for use by humans or portions thereof.

A creeper for ground work and kits/systems using such creepers for ground work have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A creeper for scooting around on top of a planar and supportive surface during intended use, wherein the creeper comprises:

a base that is a structural member, wherein the base has an exterior perimeter that has a triangular shape when the creeper is viewed from above or from below;

a seat that is attached to horizontal-members of a seat-frame, wherein the seat-frame has base-members that are attached to the base; wherein a front of the creeper is at a single corner of the triangular shape that faces away from the seat and a rear of the creeper is at a base-perimeter-frame member of the base that connects the remaining two corners of the triangular shape;

casters that are attached to the base, wherein the casters permit the base to scoot upon the top of the planar and supportive surface; and a drill-guide that is attached to the base, wherein the drill-guide permits a drill and permits at least one chuck-attachment to be used, by a human user, at a locked and predetermined angle from a vertical direction, wherein the vertical direction is orthogonal with a main plane of the top of the planar and supportive surface.

2. The creeper according to claim 1, wherein the base comprises at least one compartment accessible from a top of the base.

3. The creeper according to claim 2, wherein the at least one compartment is divided into three compartments, a central-main-compartment and two-side-flanking compartments, respectively; wherein one of the two-side-flanking compartments is located to a left of the central-main-compartment; wherein a remaining of the two-side-flanking compartments is located to a right of the central-main-compartment such that the central-main-compartment is disposed between the two-side-flanking compartments in a direction from left to right or right to left of the creeper.

4. The creeper according to claim 3, wherein the two-side-flanking compartments are triangular in shape when viewed from above the creeper.

5. The creeper according to claim 3, wherein the central-main-compartment is parallelogram in shape when viewed from above the creeper.

6. The creeper according to claim 3, wherein the central-main-compartment is located partially vertically below the seat.

7. The creeper according to claim 3, wherein the two-side-flanking compartments are not located vertically directly below the seat, such that the seat does not extend over either of the two-side-flanking compartments.

8. The creeper according to claim 1, wherein the seat-frame comprises the horizontal-members, vertical-members, and the base-members; wherein each vertical-member selected from the vertical-members is attached to a horizontal-member selected from the horizontal-member and attached to a base-member selected from the base-member.

9. The creeper according to claim 1, wherein the seat is located closer to the rear of the creeper than to the front of the creeper.

10. The creeper according to claim 1, wherein the seat-frame is a pair of elongate structural members that are shaped as an upper-case letter "U" when the creeper is viewed from a right-side or from a left-side; wherein a top opening of that upper-case letter "U" shape is facing the front of the creeper and a closed bottom-end of that upper-case letter "U" shape is facing the rear of the creeper.

11. The creeper according to claim 1, wherein the seat-frame is two elongate structural members that are spaced apart from each other by a width dimension of the seat, wherein the width dimension is from a right-side of the seat to a left-side of the seat.

12. The creeper according to claim 1, wherein the seat-frame is not adjustable so that the seat is a constant and a fixed distance from the base.

13. The creeper according to claim 1, wherein the seat-frame is adjustable in an up-down direction, that is parallel with the vertical direction, so that the seat is lockably positionable within a predetermined and finite range from the base.

14. The creeper according to claim 1, wherein the seat-frame is adjustable in a front-rear direction of the creeper, that is perpendicular to the vertical direction, so that the seat is lockably positionable within a predetermined and finite range from the rear of the base.

15. The creeper according to claim 1, wherein the creeper comprises the seat-frame.

16. The creeper according to claim 1, wherein the seat-frame comprises at least one saddle-bag.

17. The creeper according to claim 16, wherein the at least one saddle-bag comprises at least one pocket.

18. The creeper according to claim 1, wherein a caster selected from the casters is attached to a bottom of the base at the front of the creeper.

19. The creeper according to claim 1, wherein a quantity of the casters matches a quantity of main corners of the base, such that each main corner of the base has at least one caster, selected from the casters, attached thereto.

20. The creeper according to claim 1, wherein the drill-guide is mounted to the base in front of the seat.

21. The creeper according to claim 1, wherein the drill-guide is located closer to the front of the base than to the rear of the base.

22. The creeper according to claim 1, wherein the drill-guide comprises at least one suspension spring disposed around at least one guide-rail of the drill-guide.

* * * * *